United States Patent
Seastrom et al.

(10) Patent No.: US 10,567,489 B2
(45) Date of Patent: Feb. 18, 2020

(54) SYSTEM AND METHOD FOR SEAMLESS SWITCHING BETWEEN DATA STREAMS

(71) Applicant: Time Warner Cable Enterprises LLC, New York, NY (US)

(72) Inventors: Robert E. Seastrom, Leesburg, VA (US); Wesley E. George, IV, Manassas, VA (US); Jeffrey A. Aitken, Leesburg, VA (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 243 days.

(21) Appl. No.: 13/831,732

(22) Filed: Mar. 15, 2013

(65) Prior Publication Data

US 2014/0280752 A1    Sep. 18, 2014

(51) Int. Cl.
*H04N 21/43* (2011.01)
*H04N 21/462* (2011.01)
*H04L 29/08* (2006.01)

(52) U.S. Cl.
CPC ...... *H04L 67/1002* (2013.01); *H04L 67/1095* (2013.01); *H04N 21/4307* (2013.01); *H04N 21/4622* (2013.01)

(58) Field of Classification Search
CPC ... G06F 11/00–006; G06F 11/14–1695; G06F 11/20–2097; H04L 67/1095; H04N 21/4302–4307; H04N 21/4622
USPC .................. 709/217–219, 231; 714/819–821
See application file for complete search history.

(56) References Cited

U.S. PATENT DOCUMENTS

| | | | | |
|---|---|---|---|---|
| 5,862,270 A | * | 1/1999 | Lopresti et al. | 382/306 |
| 5,968,197 A | * | 10/1999 | Doiron | 714/748 |
| 6,263,371 B1 | * | 7/2001 | Geagan et al. | 709/231 |
| 6,512,776 B1 | * | 1/2003 | Jones et al. | 370/432 |
| 6,594,798 B1 | * | 7/2003 | Chou et al. | 714/820 |
| 6,910,078 B1 | * | 6/2005 | Raman et al. | 709/231 |
| 6,944,123 B1 | * | 9/2005 | Moon | 370/216 |

(Continued)

OTHER PUBLICATIONS

Cisco DCM Series D9901 Digital Content Manager—IP Video Gateway Uncompressed and JPEG2000 Transports—Data Sheet—Cisco Systems 2011 pp. 1-10.

(Continued)

*Primary Examiner* — Emmanuel L Moise
*Assistant Examiner* — Julian Chang
(74) *Attorney, Agent, or Firm* — Otterstedt, Wallace & Kammer, LLP

(57) ABSTRACT

A method for providing seamless redundancy in an output data stream includes the steps of: receiving a first data stream originating from a first location, the first data stream being conveyed over a first network path; receiving at least a second data stream originating from a second location that is geographically distinct from the first location, the second data stream comprising nominally identical content relative to the first data stream, the second data stream being conveyed over a second network path that is topologically distinct from the first network path; and combining first data segments from the first data stream and second data segments from the second data stream to generate a single, uninterrupted output data stream having a reduced likelihood of overlapping, missing and/or corrupt data segments.

28 Claims, 14 Drawing Sheets

(56) References Cited

U.S. PATENT DOCUMENTS

| | | | |
|---|---|---|---|
| 7,447,242 B2* | 11/2008 | Geagan et al. | 370/538 |
| 7,509,390 B1* | 3/2009 | Raman et al. | 709/213 |
| 7,859,292 B1* | 12/2010 | Shuler, Jr. | 326/11 |
| 7,971,121 B1* | 6/2011 | Conway | 714/747 |
| 8,040,794 B2* | 10/2011 | Eckert et al. | 370/219 |
| 8,392,748 B2* | 3/2013 | Bocharov et al. | 714/4.11 |
| 8,625,532 B2* | 1/2014 | Kuehnel | 370/331 |
| 8,676,876 B2* | 3/2014 | Dekel et al. | 709/201 |
| 8,726,400 B1* | 5/2014 | Granstrom et al. | 726/26 |
| 8,769,336 B1* | 7/2014 | Natanzon et al. | 714/6.23 |
| 8,832,709 B2* | 9/2014 | Noam et al. | 718/104 |
| 8,838,826 B2* | 9/2014 | Galanes et al. | 709/231 |
| 2002/0059623 A1* | 5/2002 | Rodriguez | H04N 5/44543 725/91 |
| 2002/0116715 A1* | 8/2002 | Apostolopoulos | 725/86 |
| 2002/0184506 A1* | 12/2002 | Perlman | H04N 21/47214 713/182 |
| 2003/0009576 A1* | 1/2003 | Apostolopoulos et al. | 709/231 |
| 2003/0056217 A1 | 3/2003 | Brooks | |
| 2003/0142670 A1* | 7/2003 | Gould et al. | 370/390 |
| 2004/0047367 A1* | 3/2004 | Mammen | 370/472 |
| 2005/0028195 A1* | 2/2005 | Feinleib et al. | 725/32 |
| 2005/0259819 A1* | 11/2005 | Oomen et al. | 380/200 |
| 2006/0224763 A1* | 10/2006 | Altunbasak et al. | 709/231 |
| 2007/0101379 A1* | 5/2007 | Pereira | 725/90 |
| 2007/0153679 A1* | 7/2007 | Jost et al. | 370/218 |
| 2007/0217436 A1 | 9/2007 | Markley et al. | |
| 2007/0237185 A1* | 10/2007 | Pereira et al. | 370/503 |
| 2007/0268899 A1* | 11/2007 | Cankaya | 370/390 |
| 2008/0062990 A1* | 3/2008 | Oran | 370/392 |
| 2008/0134165 A1 | 6/2008 | Anderson et al. | |
| 2008/0225850 A1* | 9/2008 | Oran et al. | 370/392 |
| 2008/0313708 A1* | 12/2008 | Khan et al. | 726/3 |
| 2009/0034627 A1* | 2/2009 | Rodriguez et al. | 375/240.26 |
| 2009/0034633 A1* | 2/2009 | Rodirguez et al. | 375/240.28 |
| 2009/0168867 A1* | 7/2009 | Verbrugge et al. | 375/240.01 |
| 2009/0201805 A1* | 8/2009 | Begen et al. | 370/225 |
| 2009/0208006 A1* | 8/2009 | Candelore | H04N 21/2347 380/200 |
| 2010/0036962 A1* | 2/2010 | Gahm et al. | 709/231 |
| 2010/0149992 A1* | 6/2010 | Tan | 370/242 |
| 2010/0305729 A1* | 12/2010 | Glitsch et al. | 700/94 |
| 2011/0051727 A1* | 3/2011 | Cai et al. | 370/390 |
| 2011/0149753 A1* | 6/2011 | Bapst et al. | 370/252 |
| 2011/0173340 A1* | 7/2011 | Adams | 709/231 |
| 2011/0219285 A1* | 9/2011 | Nakamura | 714/763 |
| 2012/0063301 A1* | 3/2012 | Schel | 370/225 |
| 2012/0110372 A1* | 5/2012 | Borgendale et al. | 714/4.11 |
| 2013/0014197 A1* | 1/2013 | Stokking et al. | 725/115 |
| 2013/0271655 A1* | 10/2013 | Krahnstoever et al. | 348/500 |
| 2013/0332969 A1* | 12/2013 | Stewart et al. | 725/87 |
| 2014/0029701 A1* | 1/2014 | Newham et al. | 375/340 |
| 2014/0062529 A1* | 3/2014 | Ramachandra | 326/35 |
| 2014/0189751 A1* | 7/2014 | Deiss et al. | 725/59 |
| 2014/0215278 A1* | 7/2014 | Nelson et al. | 714/47.2 |
| 2014/0222420 A1* | 8/2014 | Su et al. | 704/201 |
| 2014/0351280 A1* | 11/2014 | Sagy et al. | 707/758 |

OTHER PUBLICATIONS

Society of Cable Telecommunications Engineers American national Standard ANSI/SCTE 35 2007, Digital Program Insertion Cueing Message for Cable, 2007, cover plus pp. 1-41.

* cited by examiner

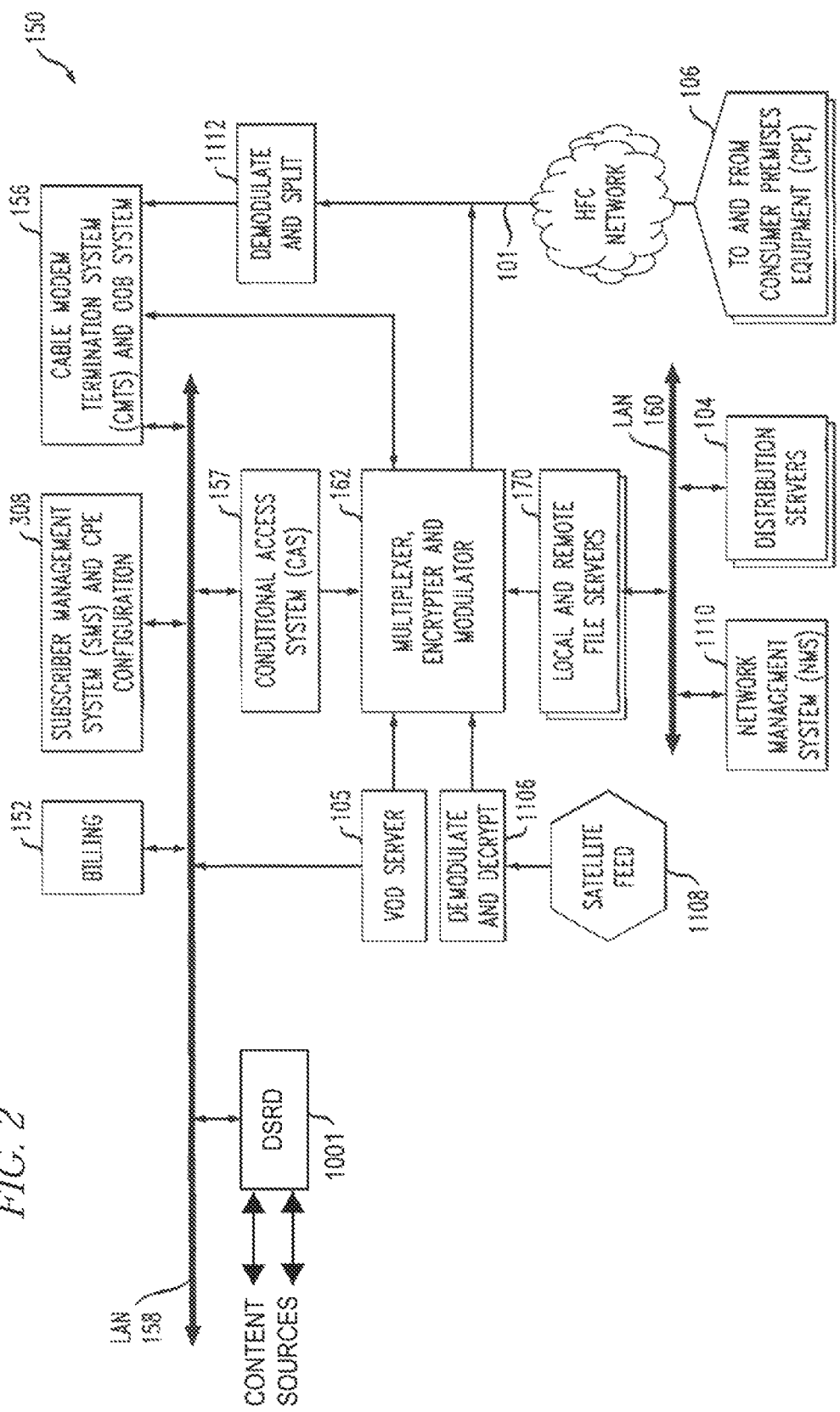

SYSTEM AND METHOD FOR SEAMLESS SWITCHING BETWEEN DATA STREAMS

FIELD OF THE INVENTION

The present invention relates generally to the electrical, electronic, and computer arts, and more particularly relates to data distribution over a network.

BACKGROUND OF THE INVENTION

The evolution of content (e.g., video, voice, and other data) delivery from analog to digital, combined with ever-decreasing costs of terrestrial hardware to carry data traffic, have created an economic incentive to converge company and other institutional backbones (e.g., Internet backbone) with regional networks for carrying data (e.g., Internet, video, and voice traffic) over the same infrastructure, thus taking advantage of cost savings by significantly reducing the number of downlinks for satellite content acquisition, such as, for example, from one downlink per region, to a couple of downlinks for the entire country.

In the context of an illustrative video delivery system, for example, one challenge in transporting video streams over an Internet backbone is how to handle network failure and ensuing reconvergence of the network. When a router or link fails, routing protocols detect the failure and reconverge (i.e., reconfigure or remap) the network's routing topology within a few seconds to a few tens of seconds. During the time that reconvergence is occurring, data traffic flow, and thus the video stream being viewed by an end user, halts until reconvergence of unicast routing and rebuilding of a multicast tree is completed. This latency is particularly detrimental to the delivery of time-sensitive data packets found, for example, in voice and video streaming applications.

Although there are known methods which seek to minimize the impact of network events and failures by attempting to decrease the duration of network reconvergence, such conventional methods add significant operational complexity to the network. Moreover, these conventional approaches require the network to perform at a higher level to meet the needs of a specific application, rather than improving an application's resiliency to successfully operate within the existing performance envelope of the network.

Accordingly, conventional approaches for reducing the impact of network failures on content delivery are undesirable or unacceptable, particularly in the context of streaming video and voice applications which are highly sensitive to latency issues.

SUMMARY OF THE INVENTION

Embodiments of the invention are directed to techniques for handling data loss (e.g., missing and/or corrupt payload data) in a content distribution system by creating a single, uninterrupted data stream from two or more nominally identical data streams originating from geographically disparate locations and conveyed over topologically distinct network paths.

In accordance with an embodiment of the invention, a method for providing seamless redundancy in an output data stream includes the steps of: receiving a first data stream originating from a first location, the first data stream being conveyed over a first network path; receiving at least a second data stream originating from a second location that is geographically distinct from the first location, the second data stream comprising nominally identical content relative to the first data stream, the second data stream being conveyed over a second network path that is topologically distinct from the first network path; and combining first data segments from the first data stream and second data segments from the second data stream to generate a single, uninterrupted output data stream having a reduced likelihood of overlapping, missing and/or corrupt data segments.

These and other features, objects and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 2 is a functional block diagram illustrating one exemplary HFC cable network headend configuration, useful within the system of FIG. 1, according to an embodiment of the invention;

Figure 1:
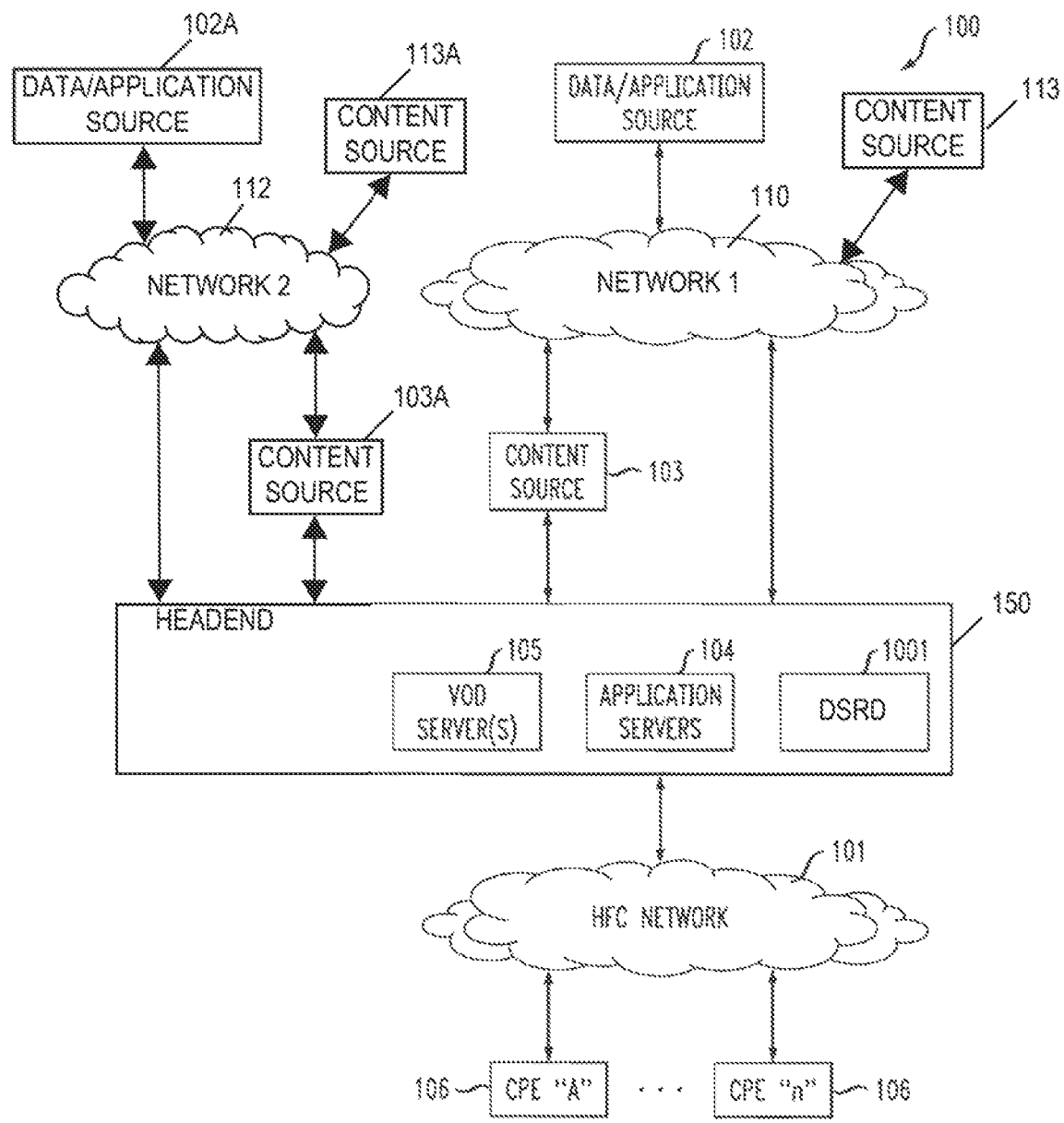
FIG. 1 is a functional block diagram illustrating at least a portion of an exemplary content-based hybrid fiber-coaxial (HFC) network configuration, according to an embodiment of the invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Aspects of the invention will be described herein in the context of an enhanced content delivery system, apparatus and methods for advantageously distributing data over a network. Specifically, embodiments of the invention are directed to techniques for seamlessly handling missing and corrupt payload data by creating a single, uninterrupted data stream from two or more nominally identical data streams originating from different locations (e.g., regions) over two or more distinct network paths. The resulting single, uninterrupted data stream has a higher resiliency, since it is unlikely that all network paths will fail within the same reconvergence period. It should be understood, however, that embodiments of the invention are not limited to the system, methods and/or apparatus shown and described herein. Rather, embodiments of the invention are more broadly applicable to techniques for providing seamless redundancy in a data stream delivered over a network to thereby reduce the impact of data packet delivery failures, as well as other failure mechanisms. Moreover, it will become apparent to those skilled in the art given the teachings herein that numerous modifications can be made to the illustrative embodiments shown that are within the scope of the claimed invention. That is, no limitations with respect to the embodiments shown and described herein are intended or should be inferred.

Purely by way of example only and without limitation, embodiments of the invention will be shown in the context of a cable multi-service operator (MSO) providing data and voice services as well as entertainment services. However, one or more embodiments are broadly applicable to any broadband network, non-limiting examples of which include an Internet Protocol (IP) network, fiber-to-the-curb (FTTC) or fiber-to-the-premises (FTTP) network, wireless broadband, and the like. Furthermore, one or more embodiments have broad application for wide-scale distribution, such as, for example, emergency alerts, software update notifications, and the like.

More particularly, embodiments of the invention are directed to techniques for handling data loss (e.g., missing or corrupt data segments) in an output data stream by creating a single, uninterrupted output data stream from two or more nominally identical (i.e., redundant) data streams originating from geographically distinct locations and conveyed over topologically distinct network paths. The term nominally identical as used herein is intended to broadly refer to two or more data streams carrying identical payload data, and in the same order, under ideal conditions; of course, if one data stream contains missing or corrupt data segments, it would no longer be identical to the other data stream(s). The term geographically distinct as used herein is intended to broadly refer to two or more locations that are physically different relative to one another. The term topologically distinct as used herein is intended to broadly refer to two or more network paths in which the set of nodes traversed in one network path is different (to the extent practicable) from the other network path(s).

Data loss can be caused by a variety of factors, including, but not limited to, signal degradation over the network medium (e.g., due to multi-path fading), packet drop (e.g., missing packets) because of channel congestion, corrupted packets rejected in-transit, channel noise, faulty networking hardware (e.g., routers, bridges, etc.), fiber cuts, faulty network drivers, or routing routines (e.g., dynamic source routing (DSR) in ad-hoc networks). Because the data streams according to embodiments of the invention are redundant, and hence the payload data are the same, missing and/or corrupt payload data from one data stream is beneficially replaced by identical payload data from the one or more of other data streams, to thereby create one uninterrupted payload data stream. For example, content having nominally identical video originating from geographically distinct locations on the network, such as Colorado and North Carolina, are transmitted over topologically distinct network paths using Internet Protocol (IP) to a common location, such as Ohio, where a single, uninterrupted data stream is generated for distribution to an end user (e.g., subscriber).

The types of content conveyed by the data streams are not limited to video and voice communications, but rather encompass essentially any data deliverable over a unicast or multicast stream for either near real-time consumption or for subsequent storage; time-sensitive data is more susceptible to packet loss and thus could realize further benefit from embodiments of the invention. For example, in addition to multimedia applications (e.g., video and audio data streams), financial applications, conveying stock ticker data streams and the like, and security applications, conveying single-source surveillance data returning over multiple paths or command and control networks, can obtain enhanced performance according to aspects of the invention. Moreover, certain compression schemes are particularly sensitive to corrupted data (e.g., MPEG i-frame vs. p-frame), and therefore aspects of the invention provide superior performance compared to a hard/unsynchronized switchover from a primary data stream to a backup/repair data stream.

In an exemplary embodiment, when two or more video streams are acquired from multiple geographically and topologically disparate locations, the streams are simultaneously monitored and used to create one seamless stream; that is, a single, uninterrupted data stream. To accomplish this, according to embodiments of the invention, two or more nominally identical data streams are received over topologically distinct network paths at a common location, and a matching function is applied to the payload data to synchronize, when necessary, the payload data of the two or more data streams to each other to thereby compensate for timing skew as well as to repair missing and/or corrupt payload data. In this manner, an error-free, uninterrupted data stream is created, even if one of the data streams fails or has one or more corrupt payload data. Subscribing to more than two data streams delivered over corresponding topologically distinct network paths can be used to provide an added level of redundancy to further reduce the likelihood of simultaneous network failures and associated data loss.

It is currently envisioned that one significant application of one or more embodiments of the invention is in the context of a video content network, such as a hybrid fiber-cable (HFC) network or an FTTP network, wherein optical fiber enters the premises and there is a point where a particular optical fiber is associated with service to a single premises or subscriber. The network may also provide high-speed data services, such as Internet (e.g., IP) or voice (e.g., Voice over Internet Protocol (VoIP)) services. It is important to note that in the context of video content networks which also offer high-speed data services, a distinction may typically be made between quadrature amplitude modulation (QAM) video, IP video, and data. In the discussion herein, "data" is also used to refer to segments of data or packets containing data payloads, which payload data may in fact be any kind of data (e.g., video or voice) that may be subsequently converted to different formats downstream. The skilled artisan will appreciate from the context what is intended.

Initially, the complete disclosure of U.S. Patent Application Publication No. 2008/0134165 to Anderson et al., entitled "Methods and Apparatus for Software Provisioning of a Network Device," published on Jun. 5, 2008, is expressly incorporated herein by reference in its entirety for all purposes. FIG. 1 illustrates an exemplary content-based network configuration 100, according to an embodiment of the invention. The various components of the network 100 include: (i) multiple data and application origination points (data/application sources) 102 and 102A; (ii) multiple content sources 103, 103A, 113 and 113A; (iii) one or more application distribution servers 104; (iv) one or more video-on-demand (VOD) servers 105; and (v) consumer (or customer) premises equipment (CPE) 106. Also included in the network 100 is a data stream repair device (DSRD) 1001, the details of which will be described in further detail herein below.

The distribution server(s) 104, VOD servers 105, DSRD 1001, and CPE(s) 106 are connected via a bearer (e.g., HFC) network 101. Servers 104, 105 can be located in a headend 150 as shown, although they are not limited to residing in the headend. Similarly, the DSRD 1001, in this embodiment, resides in the headend 150. In accordance with other embodiments, the DSRD 1001 may reside externally to the headend 150. It should be noted that in addition to a conventional HFC network, other kinds of video content networks can be employed for network 101, such as, for example, fiber-to-the-home (FTTH), also referred to herein as FTTP or FTTC. A simple architecture is shown in FIG. 1 for illustrative brevity, although it will be recognized that comparable architectures with multiple origination points, distribution servers, VOD servers, and/or CPE devices (as well as different network topologies) may be utilized consistent with embodiments of the invention. For example, the headend architecture of FIG. 2 (described in greater detail below) may be used.

Each of the data/application sources 102 and 102A, and content sources 103, 103A, 113 and 113A, comprises any medium that allows data and/or applications (such as a VOD-based or "Watch TV" application) to be transferred to a distribution server 104, for example over networks 110 and 112. This can include for example a third party data source, application vendor website, compact disk read-only memory (CD-ROM), external network interface, mass storage device (e.g., a redundant arrays of inexpensive disks (RAID) system), content distribution network (CDN) node, etc. Such transference may be automatic, initiated upon the occurrence of one or more specified events (such as the receipt of a request packet or acknowledgement (ACK)), performed manually, or accomplished in any number of other modes readily recognized by those of ordinary skill in the art, given the teachings herein. For example, in one or more embodiments, network 110 or 112 may correspond to a regional or national network or "backbone," and the data/application origination point(s) may be, for example, within a regional data center (RDC) or national data center (NDC), not explicitly shown, or on the Internet. The RDC and headend 150 may be interconnected by a network; by way of example and not limitation, a dense wavelength division multiplex (DWDM) network.

In a non-limiting example, a first data/application source 102 represents a network feed, or alternative content, obtained from a first network data center (not explicitly shown) and distributed to the headend 150 through corresponding network (Network 1) 110. Content source 113 also communicates with the headend 150 through the first network 110. Likewise, a second data/application source 102A represents a network feed, or alternative content, obtained from a second network data center (not explicitly shown) and distributed to the headend 150 through a second network (Network 2) 112. Content source 113A also communicates with the headend 150 through the second network 112. Additional content sources 103 and 103A may also be coupled between networks 110 and 112, respectively, and the headend 150. It is to be appreciated that additional devices (e.g., routers, bridges, etc.), not explicitly shown in FIG. 1, may be coupled in a network path between the data/application source(s) and the headend to facilitate content delivery.

In FIG. 1, only a single headend 150 is shown. In an illustrative cable television (CATV) network application, however, the content-based network configuration 100 can have multiple headends and content source feeds (e.g., broadcast or satellite feeds) residing in various geographically distinct locations throughout the country or another defined region (e.g., east coast, west coast). In each central video processing facility or headend, a concentration of encoders and video sources distribute national video feeds and some local feeds to various regions.

In accordance with embodiments of the invention, geographically distinct regional facilities, such as, for example, Charlotte, N.C. and Denver, Colo., can simultaneously stream nominally identical content over topologically distinct network paths to a common location, such as, for instance, Columbus, Ohio, where the streams can be combined to repair missing and/or corrupt payload data, when necessary, for providing interruption-free content to an end user.

By way of example only and without limitation, according to an embodiment of the invention, a headend in Columbus can receive two or more nominally identical data streams, each data stream originating from a geographically distinct location, for example Charlotte and Denver, and conveyed over a topologically distinct network path. When necessary, a module (e.g., DSRD 1001) in the headend 150 is operative to seamlessly repair and/or combine payload data from one data stream received from a first location over a first network path, with the other data stream received from a second location over a second network path, to produce an uninterrupted data stream sent to QAM encoders before going over the HFC network 101 to CPE 106. When no repair is necessary (i.e., no missing or corrupt data packets are present), the first (or second) data stream may be distributed to the CPE essentially without modification.

Network paths, or other communication channels, over which the nominally identical data streams are conveyed that are naturally topologically distinct from one another allow a failure in one network path to be isolated so as not to affect delivery of the content or feed from the other network path(s). In embodiments where the network paths carrying the nominally identical data streams are not naturally distinct, traffic engineering or other means (e.g., network path remapping/rerouting) can be implemented to selectively alter the network paths so that they are topologically distinct from one another.

The location (or locations) at which two or more nominally identical data streams are received and combined (when necessary) is preferably based, at least in part, on one or more network characteristics. Such characteristics which may be employed in determining where the two or more nominally identical data streams are received and combined, according to embodiments of the invention, include, for example, the local network architecture, whether there is sufficient redundancy in the upstream network, the likelihood of failure in the distinct networks, etc. Alternatively, a multi-tier arrangement can be implemented, in accordance with other embodiments, to create redundancy at geographically distinct locations within a region using redundant national feeds. This aspect is depicted in FIG. 1A.

Figure 1A:
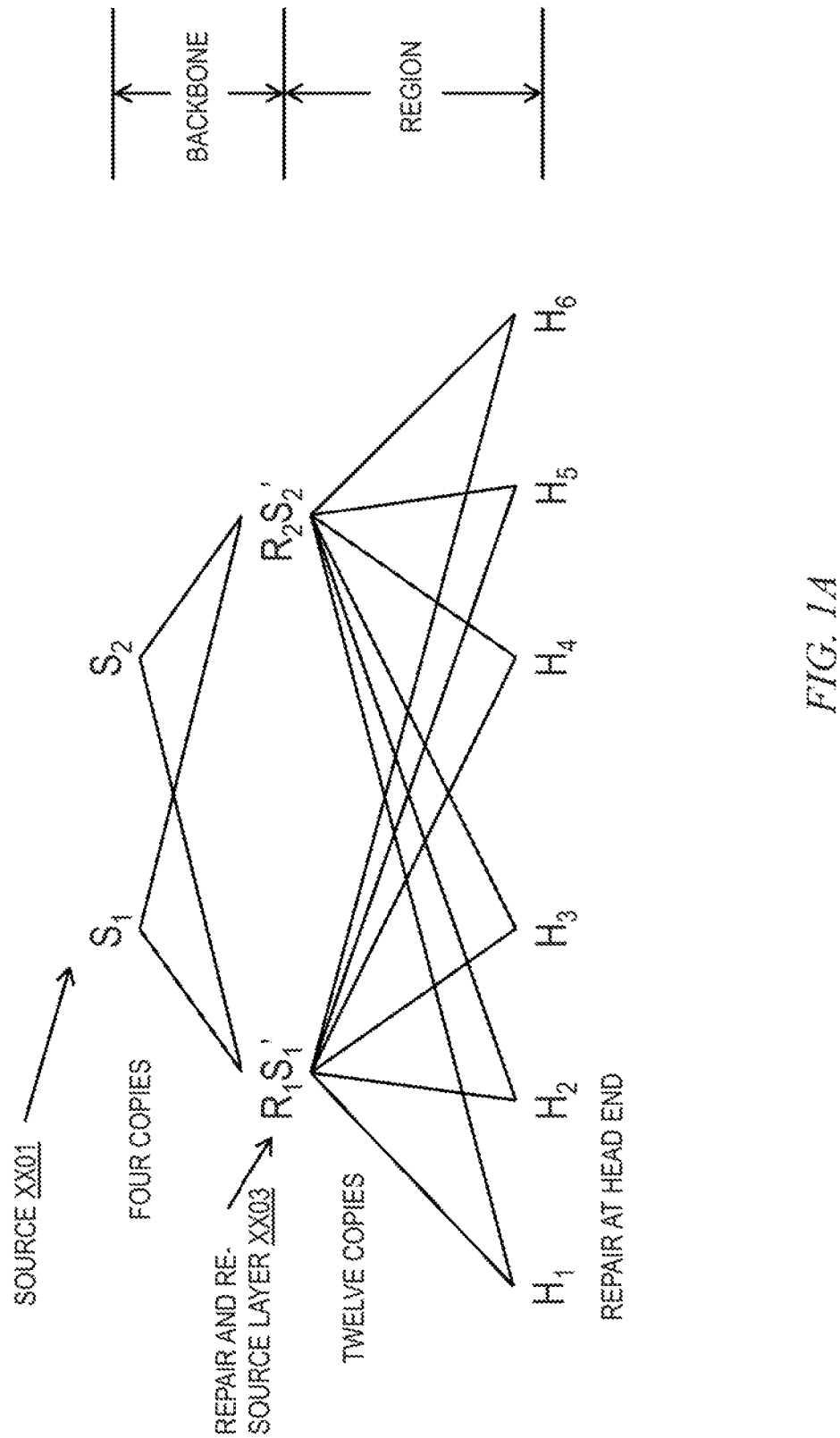
FIG. 1A conceptually depicts creating an exemplary redundancy at geographically distinct locations within a region using redundant national feeds, according to an embodiment of the invention.

Referring now to FIG. 1A, the redundant national feeds are the sources XX01, designated as $S_1$ and $S_2$. The exemplary system has six headends designated as $H_1, \ldots H_6$. If repair and re-source layer XX03 was not employed, with a DSRD 1001 in each head end, twelve copies of the data would need to be sent, one copy to each headend from each of two redundant sources XX01. This would mean that twelve copies would have to be sent over the backbone and the regional network. In the exemplary arrangement of FIG. XX, repair and re-source layer XX03 is added such that now only four copies need traverse the backbone, one copy to each repair and re-source station $R_1S_1'$ and $R_2S_2'$ from each of two redundant sources XX01. Here, a DSRD with re-sourcing capability is located at re-source station $R_1S_1'$ and $R_2S_2'$ and each station sends a feed to each of the six head ends, such that twelve copies only need to traverse the region and not the backbone.

Repair and re-source stations $R_1S_1'$ and $R_2S_2'$ may be located at any suitable nodes intermediate the sources and head ends; in a preferred but non-limiting embodiment, at a topologically advantageous location at the boundary between an MSO backbone and regional network, such as a regional data center.

The application distribution server 104 preferably comprises a computer system where such applications can enter the network system. Distribution servers per se are well known in the networking arts, and accordingly are not described further herein.

The VOD server 105 preferably comprises a computer system where on-demand content can be received from one or more of the aforementioned data sources 102, 102A, 103, 103A, 113, 113A, and enter the network system. These servers may generate the content locally, or alternatively act as a gateway or intermediary from a remote (i.e., external) source.

The CPE 106 includes any equipment in the "customers' premises" (or other appropriate locations) that can be accessed by a distribution server 104 or a cable modem termination system, or the like. Non-limiting examples of CPE include set-top boxes (STBs), routers such as premises gateway routers, and high-speed cable modems for providing high-bandwidth Internet access in premises such as homes and businesses.

FIG. 2 is a functional block diagram illustrating one exemplary HFC cable network headend configuration, useful within the system of FIG. 1, according to an embodiment of the invention. As shown in FIG. 2, the headend architecture 150 comprises typical headend components and services including billing module 152, subscriber management system (SMS) and CPE configuration management module 308, cable-modem termination system (CMTS) and out-of-band (OOB) system 156, as well as LAN(s) 158, 160 placing the various components in data communication with one another. It will be appreciated that while a bar or bus LAN topology is illustrated, any number of other arrangements (e.g., ring, star, etc.) may be used consistent with embodiments of the invention. It will also be appreciated that the headend configuration depicted in FIG. 2 is high-level, conceptual architecture, and that each MSO may have multiple headends deployed using custom architectures.

The headend architecture 150 of FIG. 2 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158 as well, although other architectures may be employed (such as, for example, where the VOD servers are associated with a core switching device such as an IEEE 802.3z gigabit Ethernet device; or the VOD servers could be coupled to LAN 160). Since information is typically carried across multiple channels, the headend 150 should be adapted to acquire the information for the carried channels from various sources. Typically, the channels being delivered from the headend 150 to the CPE 106 ("downstream") are multiplexed together in the headend and sent to neighborhood hubs via a variety of interposed network components.

Content (e.g., audio, video, etc.) is provided in each downstream (in-band) channel associated with the relevant service group. To communicate with the headend or intermediary node (e.g., hub server), the CPE 106 may use the OOB or DOCSIS channels and associated protocols. The Data Over Cable System Interface Standard (DOCSIS®) standard) was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and will be referred to for the remainder of this application in capital letters, without the "®" symbol, for convenience. The OpenCable™ Application Platform (OCAP) 1.0, 2.0, 3.0 (and subsequent) specification (Cable Television Laboratories, Inc.) provides for exemplary networking protocols both downstream and upstream, although embodiments of the invention are in no way limited to these approaches. The DOCSIS Set-top Gateway (DSG) Interface Specification, CM-SP-DSG-I19-111117, and the OpenCable™ Application Platform Specifications, OpenCable Application Platform (OCAP), OC-SP-OCAP1.2-110512, both available from the aforementioned Cable Television Laboratories, Inc., are expressly incorporated herein by reference in their entireties for all purposes.

It will also be recognized that multiple servers (broadcast, VOD, or otherwise) can be used, and disposed at two or more different locations if desired, such as being part of different server "farms." These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different locations are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1104 are fed to CMTS and OOB system 156.

With continued reference to FIG. 2, the headend 150 further includes the data stream repair device (DSRD) 1001, which in this embodiment is coupled to LAN 158. The DSRD 1001 is adapted to communicate with at least two geographically distinct content sources (e.g., 103, 103A, 113, 113A) conveying content (e.g., data packets) over at least two corresponding topologically distinct network paths. Throughout this discussion, one of the data streams may be referred to as a primary data stream, and the other data stream(s) referred to as a secondary data stream(s). It is to be appreciated that this designation is arbitrary, however, since the two or more data streams are ideally identical to one another.

More particularly, in this exemplary embodiment, the DSRD 1001 is located in the path of a particular IP stream and subscribes to two or more nominally identical source transport streams (i.e., streams comprising payload data that ought to be identical). Typically, a data stream and its data packets will be delivered by User Datagram Protocol (UDP) unicast or multicast, but delivery using other protocols, such as, for example, Transport Control Protocol (TCP), is similarly contemplated; that is, embodiments of the invention are not limited to any specific protocol used for conveying the data streams.

Figure 3:
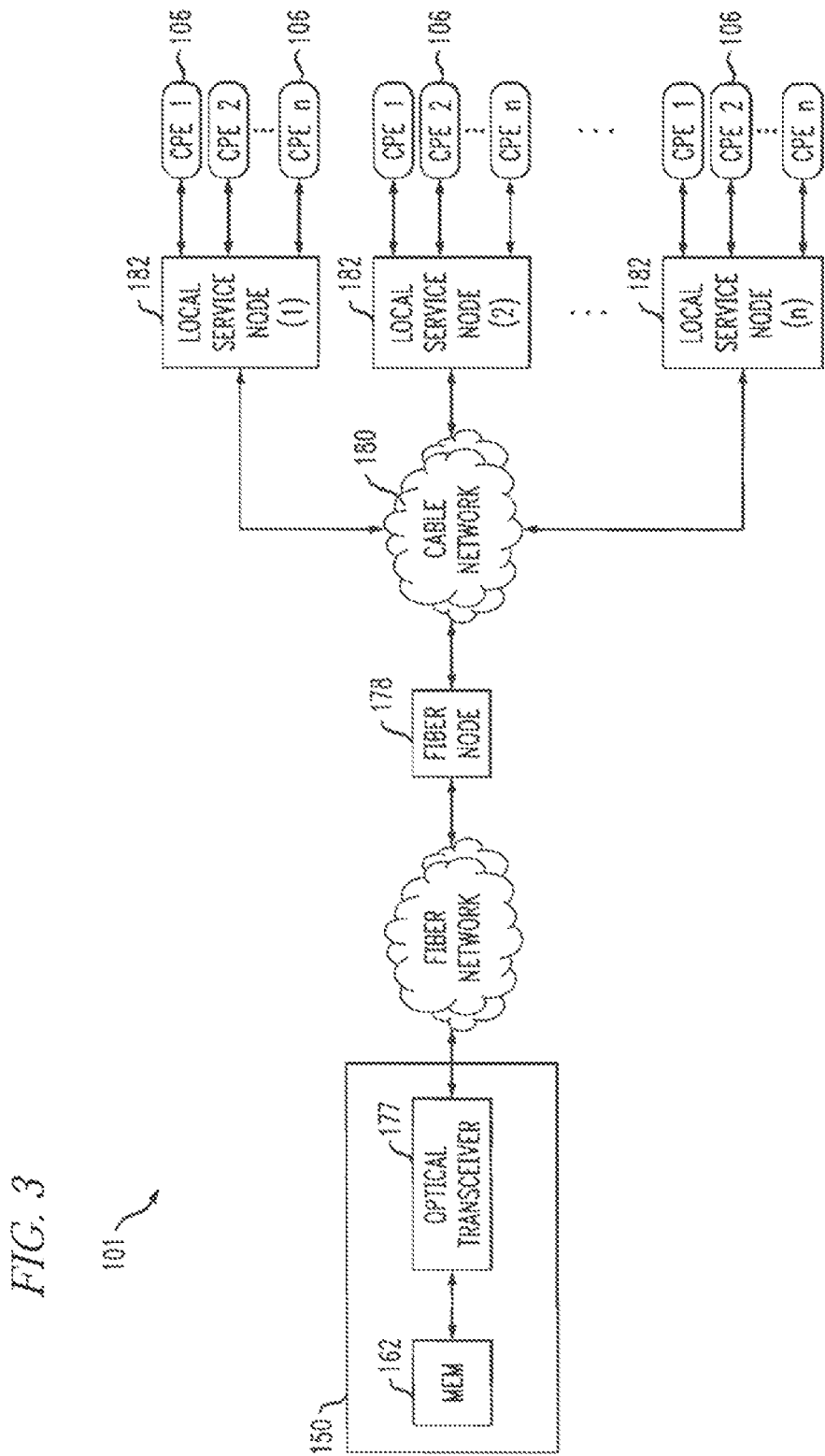
FIG. 3 is a functional block diagram illustrating one exemplary local service node configuration useful within the system of FIG. 1.

FIG. 3 is a functional block diagram illustrating one exemplary local service node configuration useful within the system of FIG. 1. As shown in FIG. 3, the network 101 of FIGS. 1 and 2 comprises a fiber/coax arrangement wherein the output of the MEM 162 of FIG. 2 is transferred to the optical domain (such as via an optical transceiver 177 at the headend 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end, where N is an integer greater than one. Each local node 182 services a number of corresponding CPEs 106. Further reference may be had to U.S. Patent Publication 2007/0217436 of Markley et al., entitled "Methods and Apparatus for Centralized Content and Data Delivery," the complete disclosure of which is expressly incorporated herein by reference in its entirety for all purposes. In one or more embodiments, the CPE 106 includes a cable modem, such as a DOCSIS-compliant cable modem (DCCM).

In another aspect, the network 101 may be a switched digital network, as known, for example, from U.S. Patent Publication 2003/0056217 of Paul D. Brooks, entitled "Technique for Effectively Providing Program Material in a Cable Television System," the complete disclosure of which is expressly incorporated herein by reference in its entirety for all purposes. The Brooks publication describes one exemplary broadcast switched digital architecture useful with one or more embodiments of the present invention, although it will be recognized by those of ordinary skill that other approaches and architectures may be substituted.

In addition to "broadcast" content (e.g., video programming), the systems of FIGS. 1-3 also deliver Internet data and voice services using the Internet protocol (IP), although other protocols and transport mechanisms of the type well-known in the digital communication art may be substituted. The IP packets are typically transmitted on RF channels that are different than the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve. It is important to note that video transmitted via IP typically uses the aforementioned RF channels that are different that the RF channels used for the broadcast video (e.g., via QAM) and audio.

When a data stream is received, such as by the DSRD 1001 shown in FIG. 2, the UDP or TCP outer container is stripped off and the stream is reduced to a series of data packets. The data packets are stripped down to native data or payload data; for example, stripping out payload data from the transport packets. By way of illustration only, in the case of an MPEG-2 transport stream, the payload size is 188 bytes and several payload data are encapsulated in each IP packet. In another format, the payload data size might exceed the size of a feasible IP packet (MTU) and therefore span several IP packets. The difference is irrelevant for the purposes of the discussion herein. It is to be appreciated, however, that not all received data streams require stripping out the payload data. For example, raw satellite streams, without any IP encapsulation, would not require stripping out the payload data.

In an illustrative scenario in which two nominally identical data streams or feeds are received, after the two data streams or feeds have been reduced to a pair of corresponding sequences of payload data, it remains to determine which pairs of payload data sequences are duplicates of each other and whether there are missing constituent parts in a primary data stream. This is accomplished, in accordance with embodiments of the invention, by examining the payload data from both streams side by side.

By way of example only and without loss of generality, in one embodiment, hash values are determined for each payload data segment (i.e., datum) of each data stream resulting in a corresponding pair of sequences of hash values, which are compared to determine if the payload data from one data steam (e.g., primary data stream) matches the payload data from the other data stream (e.g., secondary data stream). Alternatively, it is possible to directly compare payload data from one data stream with the payload data from the other data stream, without using a hashing methodology, to determine if the payload data are identical to each other, for example, in a bit-by-bit approach. However, a hashing algorithm is preferably used because it is computationally less complex and returns a large number that is essentially a fingerprint of the payload data. As is known by those having skill in the art, hashing algorithms, such as, for example, Fletcher checksum and Secure Hash Algorithm (SHA) (e.g., SHA-256), offer a sufficiently large key space (e.g., $2^{256}$ bits, in the case of SHA-256) such that the likelihood of a checksum collision is acceptably small.

Once the payload data in a given pair of sequences is determined to be identical, a single copy of the data (e.g., from the primary data stream) is placed on and used to construct an output data stream. If it is determined that one payload data of a given pair being evaluated is missing or otherwise corrupt, it may be replaced with the existing payload data and placed on the output stream. In general, the case of n data streams (n being an integer greater than or equal to two), wherein n-tuples of payload data are compared, when it is determined that one payload data of an n-tuple is missing or otherwise corrupt, it may be replaced with corresponding payload data from one of the other n−1 data streams and placed on the output data stream.

Subsequently, the payload data sequences are placed on the output stream, they are re-wrapped (i.e., encapsulated), in one simple illustrative case but without loss of generality, using the same protocol in which the data streams were originally received (e.g., UDP or TCP). In some cases, the raw payload data need not be re-wrapped, for example in the case of raw satellite streams. After, the payload data are re-wrapped in UDP or TCP, or as otherwise required by a destination device, which may be an end user (e.g. QAM modulator at a headend, multi-format encoder for the content delivery network (CDN), etc.), an output stream without missing or corrupt data segments is distributed to the end user (e.g., via the HFC network).

It should be noted that the data segments (e.g., IP packets, MPEG frames, etc.) in the data streams carrying nominally identical content typically arrive at the common location (e.g., headend) out of temporal synchronization with each other, particularly since the data streams originate from geographically distinct locations and are conveyed over topologically disparate network paths, and thus have different path delays associated therewith. In other words, the data segments from one data stream will typically arrive at a different time relative to corresponding data segments from the other data stream(s). The ability to determine the degree to which the data segments from one stream may or may not be out of synchronization with the data segments from another stream at the time of arrival at the common location will, in some embodiments, be a function of the number of payload data segments from each data stream that are, at any given time, included in the comparison procedure previously described. Furthermore, comparing payload data too rigidly (e.g., a single payload datum compared only to another single payload datum received concurrently therewith) could result in a false determination that the two or more otherwise identical streams are not identical, or that there is no matching payload data for use in a repair of the primary data stream simply because the first set of payload data segments from the received data streams do not match, when actually the streams may just be out of synchronization with one another.

Accordingly, embodiments of the invention compare a sequence of payload data from one stream to one or more segments of payload data from the one or more other data streams, to determine duplication, missing, or corrupt payload data. One implementation utilizes a buffer memory having a configurable (i.e., controllable) payload data depth adapted to ensure that there is sufficient overlap of payload data stored in memory to compensate for anticipated skew due to differences between the networks, such as, for example, propagation delay, jitter, etc. In other embodiments, a buffer having a prescribed depth is employed, the buffer depth again being selected so as to ensure that there is sufficient overlap of payload data to compensate for skew.

Typically, when receiving multiple feeds or data streams, especially when sourced from different geographic locations, due to latency between a source node (e.g., transmitter) and a destination node (e.g., receiver), among other reasons, there is often a nontrivial difference in the arrival time of the corresponding data segments, as previously noted. For example, if a first data segment (e.g., frame one) of a first data stream is transmitted from one location which is 20 milliseconds (ms) away from a receiver, and a second identical data segment (e.g., also frame one) of a second data stream is sent from another location which is 40 ms away from the receiver, in order to synchronize the payload data at the receiver there must be enough depth in the buffer memory to hold the first payload data segment and subsequent payload data segments for at least 20 ms, until frame one of the second data stream arrives at the receiver. Of course, additional buffer memory depth would increase the amount of time shift the system can accommodate before generating a glitch and also provide time for processing and comparing of the payload data, with a tradeoff being the cost of the additional memory required. The amount of buffer memory used in the system is largely a matter of design choice, to be taken into account along with other considerations such as, for example, how many data streams the system is to receive, the maximum time shift the system is designed to compensate for before generating glitches, etc.

Figure 4:
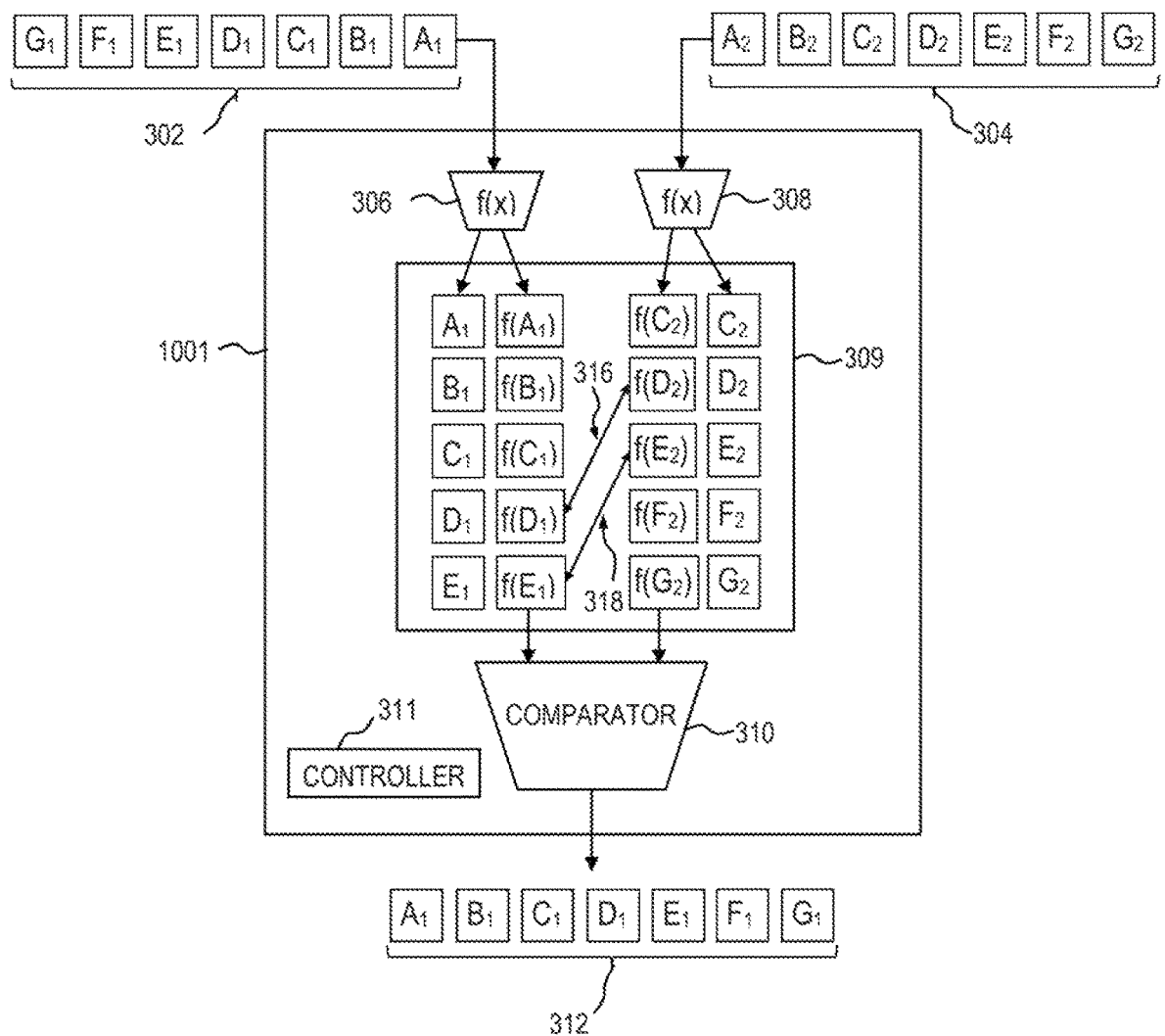
FIG. 4 is a block diagram conceptually depicting at least a portion of an exemplary data stream repair device, according to an embodiment of the invention.

FIG. 4 is a block diagram conceptually depicting at least a portion of an exemplary DSRD 1001, according to an embodiment of the invention. With reference to FIG. 4, the DSRD 1001 is operative to receive two nominally identical data streams, 302 and 304, comprising content originating from two geographically disparate locations and conveyed over topologically distinct network paths. For example, data stream 302 originates from one location, such as North Carolina, and data steam 304 originates from a different location, such as Colorado. The DSRD 1001 may reside at a third location which is different than the locations of the incoming data streams 302, 304, or it may reside at the same location as one of the data streams. In this illustration, a delay is present between receipt of the two data streams 302, 304. This delay may be attributable, for example, to propagation delay caused by the content sources being at different distances from the DSRD 1001 relative to one another (e.g., one source being 20 ms away and another source being 59 ms away). Similarly, the delay may be caused by additional queuing or processing delay at the source or in a network path between the source and receiver.

Each of the data streams 302 and 304 is comprised of individual data packets; only a portion of consecutive data packets in each stream are shown. It should be understood that both data streams 302, 304 actually include payload data $A_i$ through $N_i$, where i represent an index indicative of the data stream to which the payload data segment corresponds and N represents the number of payload data segments being transmitted from its corresponding source. For example, a first data stream 302 comprises consecutive payload data segments $A_1$, $B_1$, $C_1$, $D_1$, $E_1$, $F_1$ and $G_1$, and a second data stream 304 comprises consecutive payload data segments $A_2$, $B_2$, $C_2$, $D_2$, $E_2$, $F_2$ and $G_2$, where data segments having the same letter but different subscripts are considered to be identical (i.e., data segment $A_1$ in data stream 302 is identical to data segment $A_2$ in data stream 304).

The DSRD 1001 includes first and second hashing modules, 306 and 308, respectively. The first hashing module 306 is adapted to receive the first data stream 302 and is operative to perform any stripping necessary to reduce the stream to a series of native data, and then to perform a hashing function (f(x)) on each element (e.g., data segment). Likewise, the second hashing module 308 is adapted to receive the second data stream 304 and is operative to perform any stripping necessary to reduce the stream to a series of native data, and then to perform a hashing function (f(x)) on each element. The hashing modules 306, 308 are operative to facilitate comparison of the payload data between the received data streams to determine if corresponding data segments being compared match one another.

Since the two data streams contain nominally identical content, it is assumed that the particular hashing functions employed by the respective hashing modules 306 and 308 must also be the same, thus creating a set of identical hashes for identical input data. The hashing function is selected based at least in part on the type of data packet received, the payload type (e.g., MPEG-2 transport stream), etc., as will be known by those skilled in the art. The hash function employed by the hashing modules 306, 308 can be essentially any hash function that ensures a correct amount of entropy to avoid hash collisions over the period of payload data buffered in the memory 309. It is to be appreciated that, although depicted as separate functional blocks, the hashing modules 306 and 308 can be combined into a single functional block, with the functions of each module incorporated into the new block.

Each of the hashing modules 306, 308 can be implemented in hardware (including, for example, field-programmable gate arrays (FPGAs) and the like), in software embodied in a non-transitory manner on a storage medium and executing on one or more hardware processors, or as a combination of hardware and software components, as will become apparent to those skilled in the art. For embodiments in which more than two data streams are utilized, an additional hashing module will be included in the DSRD 1001 corresponding to each additional data stream.

Each of the hashing modules 306, 308 will generate hash values corresponding to the respective payload data segments (i.e., datums). The hash values and associated payload data are stored in a buffer 309 or alternative memory, by way of example only and without limitation, as an array of ordered pairs, or using an alternative storage arrangement. An association of each payload data segment to its corresponding hash value is also maintained in buffer 309 so that, given a particular hash value, its associated payload data can be easily retrieved. In accordance with one embodiment, the buffer 309 comprises a circular buffer having a prescribed depth; once the buffer has been filled, the oldest data stored therein is overwritten. Circular buffers are well-known in the art and hence will not be described in further detail herein. A depth of the buffer 309 may be selected as a function of the number of overlapping payload data segments that are to be kept in anticipation of an expected an amount of skew in the system, as previously described. In this example, the first hashing module 306 generates hash values $f(A_1)$, $f(B_1)$, $f(C_1)$, $f(D_1)$, $f(E_1)$, $f(F_1)$ and $f(G_1)$, corresponding to received payload data segments $A_1$, $B_1$, $C_1$, $D_1$, $E_1$, $F_1$ and $G_1$, respectively. Similarly, the second hashing module 308 generates hash values $f(C_2)$, $f(D_2)$, $f(E_2)$, $f(F_2)$ and $f(G_2)$, corresponding to received payload data segments $C_2$, $D_2$, $E_2$, $F_2$ and $G_2$, respectively. It should be understood that the payload data $A_1$ through $E_1$ and payload data $C_2$ through $G_2$ stored in the buffer 309 represent the order in which the payload data is received by the hashing modules 306 and 308, respectively, over a discrete time period.

A comparator 310 included in the DSRD 1001 is coupled with the buffer 309 and operative to evaluate two or more hash values for corresponding data streams to determine whether the hash values match one another. A matching set of hash values is indicative of a match in the corresponding payload data from the disparate data streams, and vice versa. As buffer 309 stores incoming payload data and hash values from the respective hashing modules 306 and 308, the comparator 310 retrieves the hash values from the buffer for processing.

A controller 311 is operative to determine which of the data streams is the first to arrive at the DSRD 1001, such as at inputs to the hashing modules 306 and 308, and designates this data stream as a main (i.e., primary) data stream. This functionality may also be incorporated into one or more of the other blocks, such as, for example, into the comparator 310. The controller 311 may perform other functions as well, such as measuring a delay between the arrival of the data streams 302, 304 at the DSRD 1001. The main data stream is the data stream relied upon to provide most of the payload data for building an uninterrupted output data stream 312; thus, assuming there are no failures (e.g., missing or corrupt data packets) present in the main data stream, the output data stream 312 will be constructed entirely from the main data stream. The second data stream to arrive at the DSRD 1001 is designated as a repair data stream, and is relied upon to provide substitute payload data for missing and/or corrupt payload data segments in the main data stream, when needed. It is to be appreciated that, when working properly (i.e., no failures), the main and repair data streams are identical, and therefore it is irrelevant which data stream the output data stream is constructed from.

When both data streams arrive at substantially the same time (e.g., within a prescribed window of time), one data stream is arbitrarily selected as the main data stream and the other data stream is designated as the repair data stream. In embodiments wherein three or more data streams are used, the second and subsequent data streams to arrive, after the main data stream, are all designated as repair data streams; either of the repair data streams can be used to repair the main data stream. In this example, data stream 302 arrives first and is therefore designated as the main data stream, with data stream 304 designated as the repair data stream.

In the exemplary scenario depicted in FIG. 4, it is apparent that the payload data from data streams 302 and 304 are not in synchronization with one another at the time of arrival at the DSRD 1001. Specifically, in this example, payload data segment $A_1$ from the first data stream 302 arrives coincident with payload data segment $C_2$ from the second data stream 304. Consequently, although the data streams 302, 304 may be identical in terms of content, the comparator 310 will not detect matching data between the two streams because of the timing skew between the data streams, represented by arrows 316 and 318 in FIG. 4. To remedy this situation, the comparator 310 is operative to perform a synchronization procedure as a function of a measured delay between the data streams 302, 304. Until synchronization is found between the data streams 302, 304, the output data stream 312 will default to the first data stream to arrive (i.e., the main data stream); data stream 302 in this example. Once the two data streams 302, 304 are synchronized, the comparator 310 will be able to determine whether the payload data segments from one stream match corresponding payload data segments from the other stream to thereby build the output data stream 312 having a higher resistance to network failures compared to a single data stream without any repair mechanism.

Operationally, in one embodiment, the comparator 310 compares the first hash value of each data stream and if a match is not found, expands the number of hash values in the comparison until at least one match is found. In essence, the comparator 310 forms an expanding window, where if two hash values are compared and do not match, the window can be expanded to compare more hash values until the comparator determines where in the sequence of hash values a match is found. Once one or more matches are found and a delay value between arrival of the two data streams is determined, the comparator 310 knows where in the buffered sequence of hash values each data stream is aligned (i.e., the synchronization starting point) and thus can match subsequent hash values of both data streams 302 and 304, thus forming a synchronization lock. If a data stream drops out and returns, the process is repeated until a new starting point for synchronization is determined.

Generally, after determining the delay between data streams, to determine if there are glitches in the main data stream 302, the comparator 310 matches the hash values that follow in the sequences. For example, if comparator 310 determines that main data stream 302 is missing a hash value from the sequence, or if a hash value is determined to be corrupt, knowing the delay, comparator 310 can identify the data position or time slot in buffer 309 of the missing hash value in the main data stream and repair the main data stream by inserting or substituting the missing or corrupt payload data with the payload data of the corresponding hash value from the repair data stream when generating the output data stream 312.

Alternatively, if comparator 310 determines that a hash value from one data stream has a corresponding hash value from the other data stream (e.g., $f(K_1)$ and $f(K_2)$ both exist) but the hash values do not match (e.g., one of the data streams has corrupt payload data), then the comparator selects one of the associated payload data (e.g., $K_1$ or $K_2$) to pass on to the output stream 312. It should be noted that in this example, with two data streams, comparator 310 has no way of knowing with certainty which stream is the best (in terms of quality) or most complete, and must therefore arbitrarily pick one payload data to send to the output data stream 312. In accordance with one embodiment, the payload data from the main data stream is selected when the two hash values do not match. In this example, data streams 302 and 304 do not have corrupt or missing payload data thus comparator 310 passes all payload data $A_1$ through $E_1$ from main data stream 302 to the output data stream 312.

Figure 5:
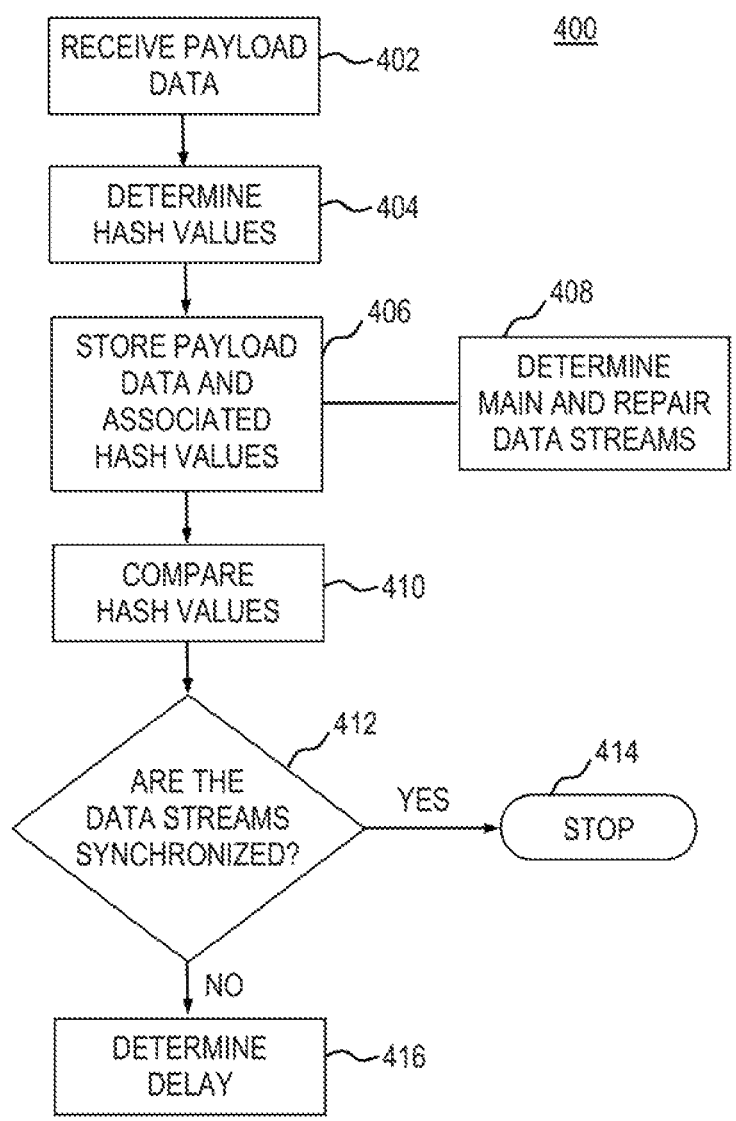
FIG. 5 is a flow diagram depicting at least a portion of an exemplary method for synchronizing the arrival of two or more data streams in the illustrative data stream repair device shown in FIG. 4, according to an embodiment of the invention.

FIG. 5 is a flow diagram depicting at least a portion of an exemplary method 400 for synchronizing the arrival of two or more data streams which is suitable for use in the DSRD 1001 of FIG. 4, according to an embodiment of the invention. With reference to FIG. 5, payload data from two or more data streams (e.g., 302 and 304 in FIG. 4) is received in step 402. In step 404, hash values corresponding to each of the received payload data segments are determined (e.g., by hashing modules 306 and 308 in FIG. 4). The hash values and associated payload data segments are stored, such as in a buffer (e.g., buffer 309 in FIG. 4) or alternative memory, in step 406. Based on which data stream arrives first, step 408 designates one of the data streams as a main data stream and the other data stream(s) as a repair data stream(s).

In step 410, the hash values corresponding to the received data streams are compared to determine if a match exists (e.g., by comparator 310 in FIG. 4). Step 412 analyzes the results of the comparisons to determine whether or not the data streams are arriving in synchronization. In one embodiment, this involves determining where in the stored sequence of payload data received by hashing modules 306 and 308 (FIG. 4) the payload data from one data stream starts to match the payload data from the other data stream.

The point in the sequence at which a match is found is a synchronization starting point. Generally, if identical payload data arrive at the hashing modules concurrently, the data streams are considered to be in synchronization, and the synchronization process stops 414. When the two data streams are in synchronization, the buffering effectively masks differences in delay from the processor (e.g., computer or alternative controller). According to embodiments of the invention, a prescribed threshold tolerance is established within which the two data streams can arrive and still be considered to be synchronized.

Alternatively, if the hash values do not match, even after evaluating multiple sets of consecutive hash values, it is determined, in step 412, that the data streams are not synchronized. When the data streams are not synchronized, a delay between the data streams is calculated in step 416 (e.g., by controller 311 in FIG. 4). The delay can be determined, in one or more embodiments, by examining buffered sequences of hash values and/or payload data corresponding to the first and second data streams (e.g., stored in buffer 309 of FIG. 10), although embodiments of the invention are not limited to this approach for determining the delay. The delay value determined in step 416 can be used to selectively adjust which data segment from the repair data stream the comparator is processing at any given time. This can be performed, for example, by moving a pointer to selected locations in the buffer so as to synchronize the data streams. In the example scenario shown in FIG. 4, the delay or lead/lag time is two time periods or two discrete payload data segments.

Figure 6:
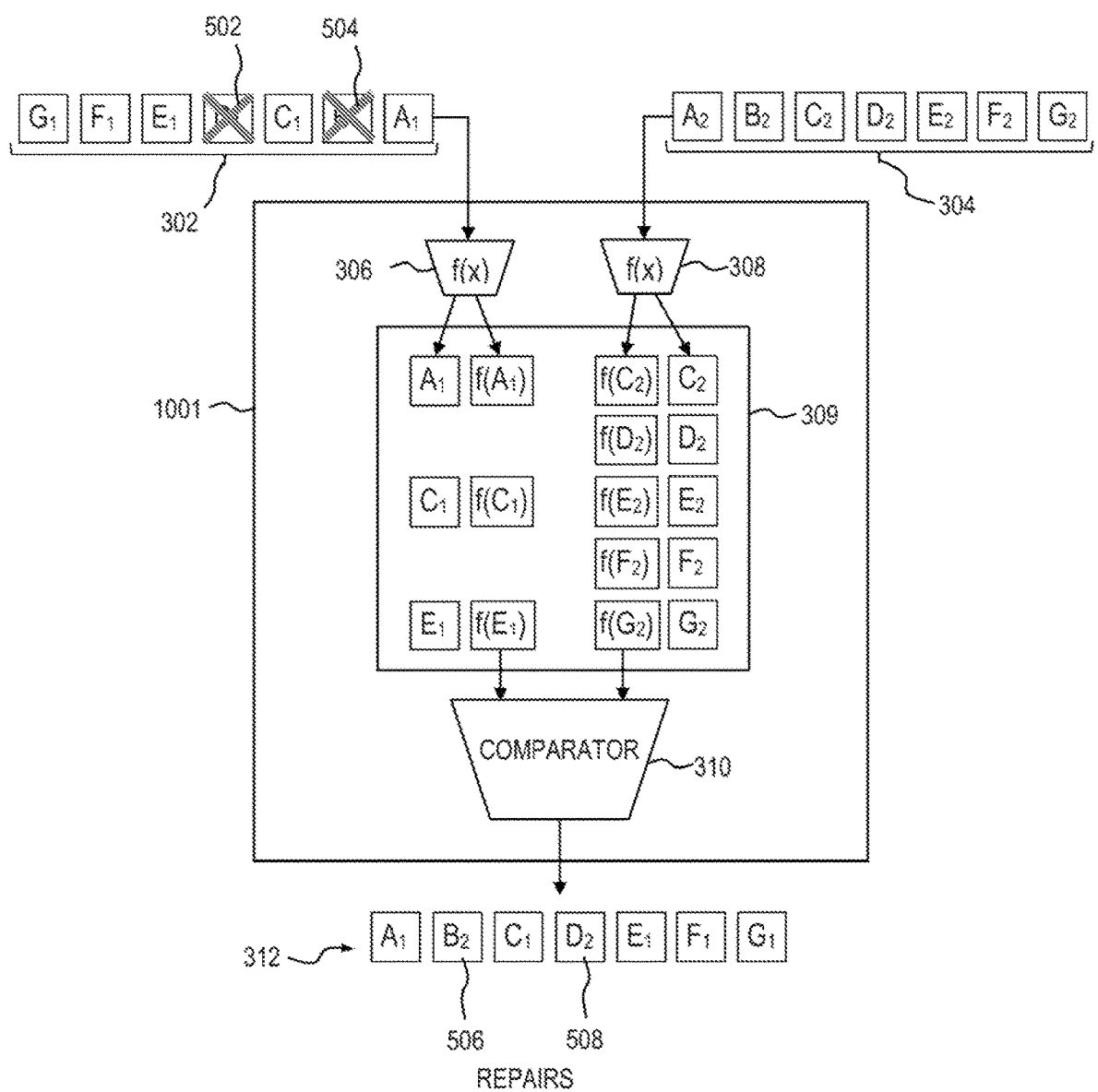
FIG. 6 is a block diagram conceptually depicting the exemplary data stream repair device shown in FIG. 4, operative to repair a data stream experiencing intermittent data loss, according to an embodiment of the invention.

FIG. 6 is a block diagram conceptually depicting the exemplary DSRD 1001 shown in FIG. 4, operative to repair a data stream experiencing intermittent data loss, according to an embodiment of the invention. In this example, as in the scenario shown in FIG. 4, the DSRD 1001 is configured to receive two data streams 302 and 304 comprising nominally identical payload data originating from geographically distinct locations and being conveyed over topologically distinct network paths. Generally, there are multiple data streams continuously feeding payload data to the hashing modules 306, 308, while the comparator 310 is busy performing multiple comparisons of the associated hash values to determine what payload data should be repaired, in the case of missing and/or corrupt payload data.

As apparent from FIG. 6, data stream 302 contains two missing payload data segments (e.g., data lost during transmission), namely, $D_1$ 502 and $B_1$ 504, and therefore includes payload data segments $A_1$, $C_1$, and $E_1$ through $G_1$. Data stream 304, by comparison, does not experience any data loss, and therefore includes payload data $A_2$ through $G_2$. It should be noted that data stream 302 may actually include payload data segments $A_1$ through $N_1$, with the exception of missing payload data segments $B_1$ and $D_1$, and that data stream 304 includes all payload data segments $A_2$ through $N_2$, where N is any integer representative of the number of payload data segments being transmitted from its corresponding content source. In this example, payload data $A_1$, $C_1$, and $E_1$ through $G_1$ and payload data $A_2$ through $G_2$ have been selected for illustrative purposes only. Data stream 302 arrives at the DSRD 1001 first and is thus designated as the main data stream, making data stream 304 the repair data stream.

The buffer 309 in the DSRD 1001 will temporarily store received payload data segments along with associated hash values determined by hashing modules 306 and 308, as previously explained. Since data stream 304 contains payload data segments $B_2$ and $D_2$, which are identical to missing payload data segments $B_1$ and $D_1$, there will be a hash mismatch, and thus a hash scan is performed to confirm missing data. When building the output data stream 312, the comparator will output the first payload data $A_1$ from the main data stream 302, since the hash value $f(A_1)$ associated with payload data $A_1$ from data stream 302 matches the hash value $f(A_2)$ associated with payload data $A_2$ from the data stream 304. When processing the next data segment, the comparator will not find a hash value $f(B_1)$ since its associated payload data segment $B_1$ is missing in data stream 302. Therefore, the comparator 310 will send the payload data segment $B_2$ from the repair data stream 304 to fill the next slot 506 in the output data stream 312 to thereby supplement the missing payload data segment in the main data stream 302. Processing the next payload data segment, the comparator 310 will again find matching hash values $f(C_1)$ and $f(C_2)$ associated with payload data $C_1$ from data stream 302 and payload data $C_2$ from data stream 304, respectively. Therefore, the comparator 310 will send payload data segment $C_1$ from the main data stream 302 to the output data stream 312. Similarly, when processing the next data segment, the comparator 310 will not find a hash value $f(D_1)$ since its associated payload data segment $D_1$ is missing in data stream 302. Therefore, the comparator will send the payload data segment $D_2$ from the repair data stream 304 to fill the next slot 508 in the output data stream 312 to supplement the missing payload data segment in the main data stream 302, so that there is no loss of data and thus no glitching in the output data stream. This process of building the output data stream 312 repeats until the output data stream has been completed.

In this exemplary scenario, the main data stream 302 experiences some dropped payload data segments ($B_1$ and $D_1$), but otherwise the data stream recovers on its own. These dropped data segments, if left unrepaired, would appear as glitches in the output data stream. If the main data stream experiences a number of consecutive missing payload data segments greater than a prescribed threshold, a decision would be made to switch the main and repair data stream designations; that is, data stream 304 would be used as the main data stream and data stream 302 used as the repair data stream. An example scenario for handling consecutive missing payload data in the main data stream is described in further detail below in conjunction with FIG. 8. The threshold number of consecutive missing payload data segments detected before switching data streams is adjustable (i.e., controllable) by the user, according to one or more embodiments; in other embodiments, this threshold is set to a prescribed number (e.g., four).

Figure 7:
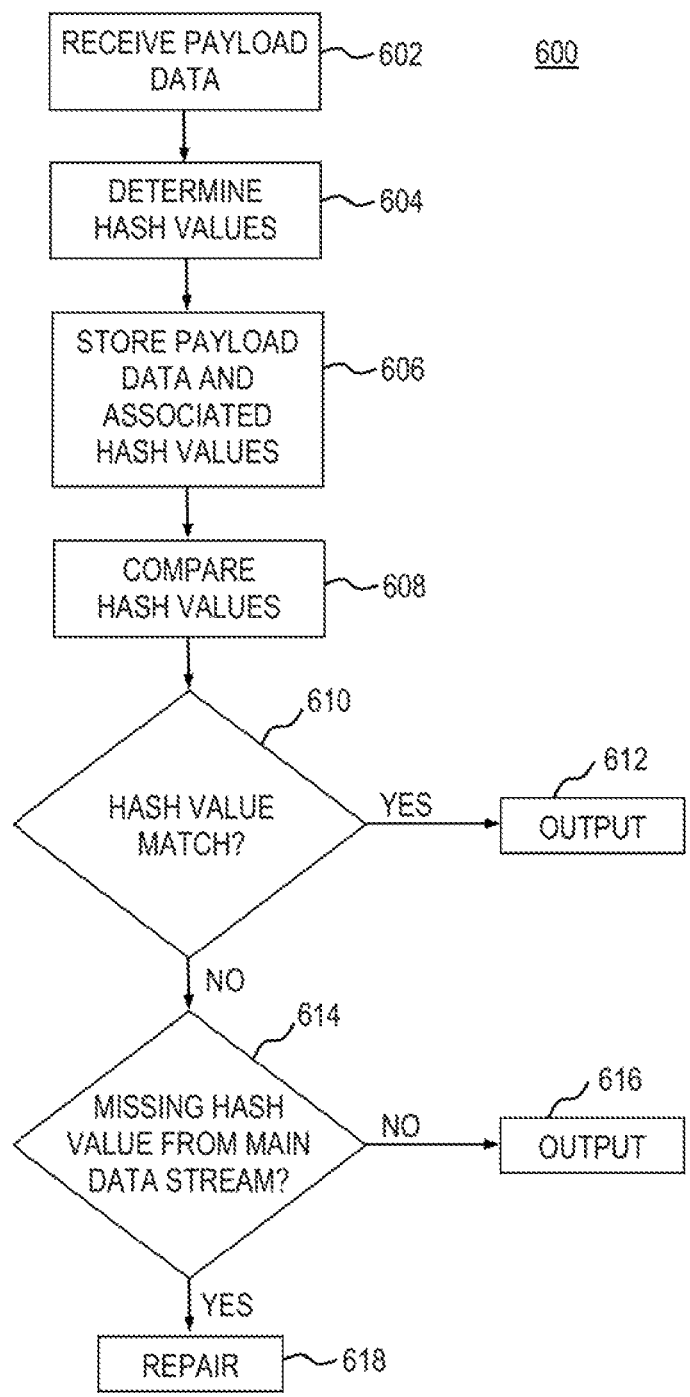
FIG. 7 is a flow diagram depicting at least a portion of an exemplary method for repairing a data stream experiencing intermittent data loss, according to an embodiment of the invention.

FIG. 7 is a flow diagram depicting at least a portion of an exemplary method 600 for repairing a data stream experiencing intermittent data loss, according to an embodiment of the invention. Method 600 may be employed in the illustrative DSRD 1001 shown in FIG. 4. Referring now to FIG. 7, payload data is received by the DSRD 1001 in step 602. The payload data originates from at least two data streams (e.g., 302 and 304 in FIG. 6) comprising nominally identical payload data originating from geographically distinct locations and being conveyed over topologically distinct network paths. In step 604, hash values corresponding to each of the received payload data segments are determined (e.g., by hashing modules 306 and 308 in FIG. 6). After hash values for the payload data segments being processed are determined, the hash values and associated payload data segments are stored, such as in a buffer (e.g., buffer 309 in FIG. 6) or alternative memory, in step 606.

Knowing and compensating for delay or lead/lag time, if any, between the arrival of the data streams (e.g., by using one or more of the exemplary methods previously described for determining a synchronization starting point), hash values of payload data from the received data streams are compared in step 608 (e.g., by comparator 310 in FIG. 6) to determine if there are any corrupt or missing payload data in the main data stream 302. In step 610, the results of the comparisons are analyzed to determine whether or not the hash values match. Here, it is assumed that the data streams are in synchronization; if they are not, the exemplary method 400 depicted in FIG. 4 and described above can be employed. When the hash values match, the associated payload data segment from the main data stream (302 in FIG. 6) corresponding to the hash value being processed is sent to the output data stream (312 in FIG. 6) in step 612.

Alternatively, if the hash values do not match, step 614 determines whether or not the hash value being processed from the main data stream is missing. When it is determined that the hash value from the main data stream is not missing, the associated payload data segment corresponding to that hash value being evaluated is sent to the output data stream in step 616. Otherwise, when step 614 determines that that the hash value from the main data stream is missing, knowing and compensating for the delay or lead/lag time, if any, between the data streams, the payload data position or time slot of the missing payload data segment in the main data stream (e.g., 302) is identified (e.g., by comparator 310), and in step 618 the missing payload data is replaced in output data stream (312) with an identical payload data segment from the repair data stream (e.g., 304).

Figure 8:
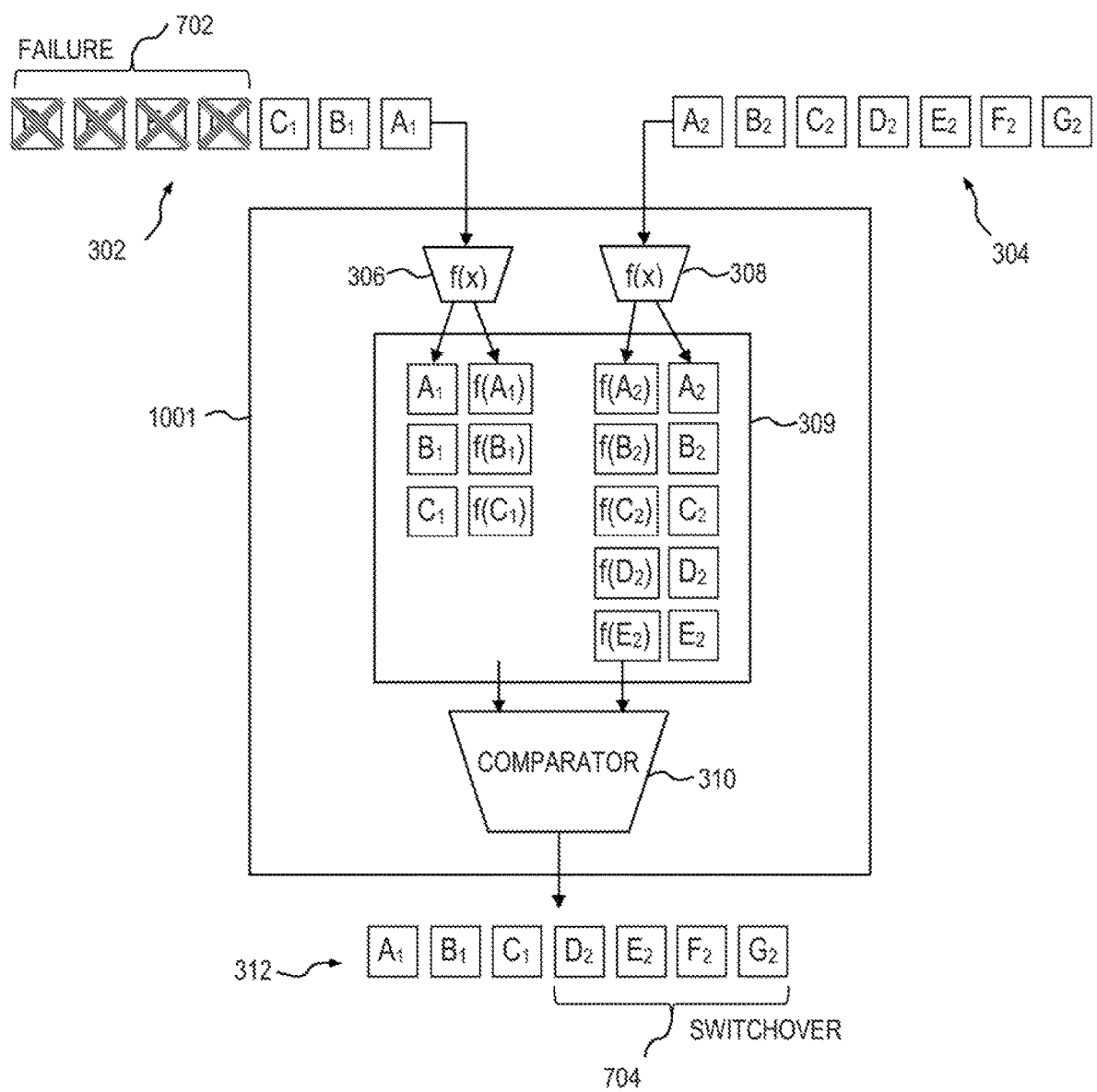
FIG. 8 is a block diagram conceptually depicting the exemplary data stream repair device shown in FIG. 4, operative to switch from a primary data stream that is experiencing complete data loss to a secondary operational data stream, according to an embodiment of the invention.

FIG. 8 is a block diagram conceptually depicting the exemplary DSRD 1001 shown in FIG. 4, operative to switch from a primary data stream that is experiencing complete data loss (e.g., failure 702) to a secondary operational data stream, according to an embodiment of the invention. Specifically, the scenario of FIG. 8 illustrates how, in one embodiment, the DSRD 1001 seamlessly switches, at an optimal moment in time, from a data stream that is experiencing a complete loss of payload data to a second operational data stream, so that there is no loss of data in the output sequence and thus no glitching on the output data stream 312. In this example, as in the scenarios shown in FIGS. 4 and 6, the DSRD 1001 is configured to receive two data streams 302 and 304 comprising nominally identical payload data originating from geographically distinct locations and being conveyed over topologically distinct network paths. The data streams 302, 304 send payload data to the hashing modules 306, 308, while the comparator 310 performs multiple comparisons of the associated hash values to determine what payload data should be repaired, in the case of missing and/or corrupt payload data (see FIG. 6), or whether a switchover to a secondary data stream should be made, in the case of a detected failure of the primary data stream.

In this example, using methods described above, data stream 302, which arrives at the DSRD 1001 first, is determined to be the main (i.e., primary) data stream while data stream 304 is determined to be the repair (i.e., secondary) data stream. It is to be understood that while only two data streams are shown for ease of explanation, embodiments of the invention may be similarly used with more than two data streams. As will become apparent to those skilled in the art given the teachings herein, using more data streams provides a higher level of robustness, accuracy and enhanced data corruption detection in the system, at the expense of increased system overhead and complexity. As shown in FIG. 8, data stream 302 includes payload data $A_1$, $B_1$, and $C_1$, with payload data segments $D_1$ through $G_1$ illustrated as crossed out to indicate missing data. Consecutive missing payload data may occur, for example, as a result of a transmission failure. Data stream 304 includes payload data $A_2$ through $G_2$. In actuality, data stream 302 may include payload data $A_1$ through $N_1$ (except in this case payload data $D_1$ through $N_1$ is lost), and data stream 304 may include payload data $A_2$ through $N_2$, where N is any integer representative of the number of payload data segments being transmitted from its respective content source.

Payload data $A_1$, $B_1$ and $C_1$ from data stream 302 and payload data $A_2$ through $E_2$ from data stream 304 are stored in the buffer 309, along with associated hash values $f(A_1)$, $f(B_1)$, $f(C_1)$ and $f(A_2)$, $f(B_2)$, $f(C_2)$, $f(D_2)$, $f(E_2)$, respectively, computed by hashing modules 306 and 308. These payload data segments and associated hash values are shown, by way of illustration only, for a given moment in time.

The hash values stored in the buffer 309 are input to comparator 310. The comparator 310, knowing and compensating for delay or lead/lag time, if any, between the arrival of the data streams 302, 304 (e.g., by using one or more of the exemplary methods previously described for determining a synchronization starting point), is able to match hash values $f(A_1)$ through $f(C_1)$ associated with payload data segments $A_1$ through $C_1$, respectively, from the main data stream 302 with the hash values $f(A_2)$ through $f(C_2)$ associated with payload data segments $A_2$ through $C_2$, respectively, from data stream 304. Hash values $f(D_1)$ and $f(E_1)$ do not exist in the buffer 309, however, because the associated payload data segments $D_1$ and $E_1$ were not received at the DSRD 1001 due to a transmission failure in data stream 302. Consequently, the comparator 310 will not find a match for hash values $f(D_2)$ and $f(E_2)$.

After detecting multiple consecutive missing payload data segments $D_1$ and $E_1$ in the main data stream 302, comparator 310 determines that data stream 302 has completely failed (702). Thus, rather than inserting or repairing the missing payload data $D_1$ and $E_1$ from the repair data stream 304, as in the case of an intermittent failure (FIG. 6), comparator 310 performs a switchover 704 from the main data stream 302 to the repair data stream 304 at the time of the last match between hash values (in this case, after matching hash values for payload data segment $C_1$), making data stream 304 the main data stream. The comparator 310 seamlessly switches data streams without interrupting the output data stream 312. For example, output data stream 312 is constructed with payload data segments $A_1$, $B_1$, $C_1$ from data stream 302 and then switches (704) to payload data segments $D_2$, $E_2$, $F_2$ from data stream 304 without interruption in the sequence. If data stream 302 comes back on line, then using methods previously described, the two data streams 302 and 304 are resynchronized. In one or more illustrative embodiments, data stream 304 could continue to serve as the main data stream, given that it is already delivering the payload data to the output data stream 312, and the comparator 310 would simply compensate for delay or lead/lag time, if any, between the received data streams. Alternatively, in other embodiments, when appropriate conditions are met, data stream 302 could be re-promoted to serve as the primary data stream.

The timing of when to make the switchover 704 from the main data stream 302 to the repair data stream 304 is a function of the number of consecutive missing payload data segments that are detected. In accordance with embodiments of the invention, a threshold number is set indicating a limit for the number of consecutive missing payload data segments that can be detected before switching over the repair data stream. For example, if the threshold is set at two, once more than two consecutive missing payload data segments are detected by the comparator 310, a switch to the repair data stream 304 will be performed for building the output data stream 312. In general, according to other embodiments, if the threshold is set at n, the comparator will wait until n consecutive missing payload data segments are detected before initiating a switch to the repair data stream, where n is any integer greater than one.

Figure 9:
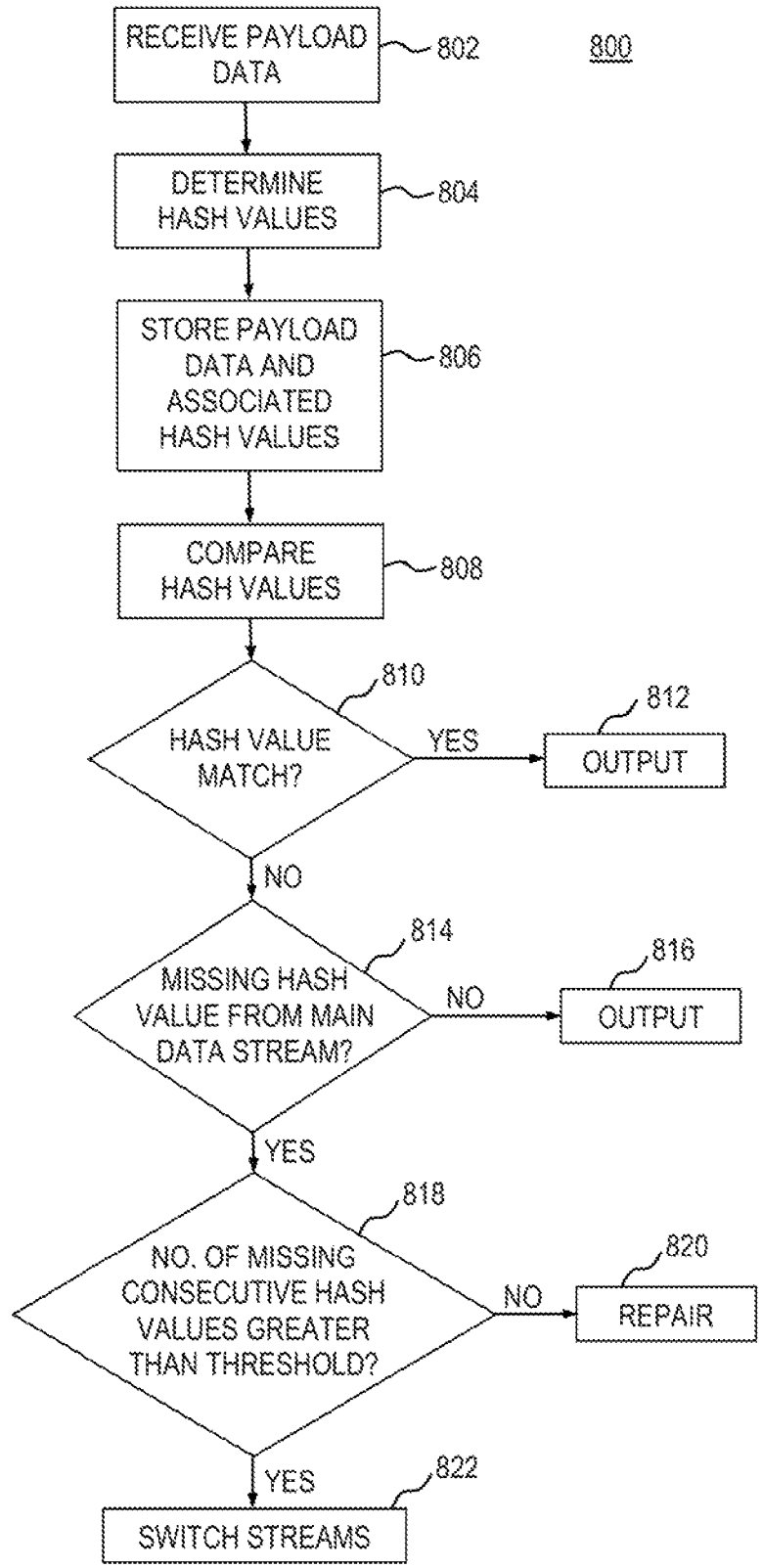
FIG. 9 is a flow diagram depicting at least a portion of an exemplary method for switching from a data stream experiencing complete data loss to a second operational data stream, according to an embodiment of the invention.

FIG. 9 is a flow diagram depicting at least a portion of an exemplary method 800 for switching from a data stream experiencing complete data loss to a second operational data stream, according to an embodiment of the invention. Method 800 may be employed in the illustrative DSRD 1001 shown in FIG. 4. Referring now to FIG. 9, payload data is received by the DSRD 1001 in step 802. The payload data originates from at least two data streams (e.g., 302 and 304 in FIG. 8) comprising nominally identical payload data originating from geographically distinct locations and being conveyed over topologically distinct network paths. In step 804, hash values corresponding to each of the received payload data segments are determined (e.g., by hashing modules 306 and 308 in FIG. 8). After hash values for the payload data segments being processed are determined, the hash values and associated payload data segments are stored, such as in a buffer (e.g., buffer 309 in FIG. 8) or alternative memory, in step 806.

Knowing and compensating for delay or lead/lag time, if any, between the arrival of the data streams (e.g., by using one or more of the exemplary methods previously described for determining a synchronization starting point), hash values of payload data from the received data streams are compared in step 808 (e.g., by comparator 310 in FIG. 8) to determine if there are any corrupt or missing payload data in the main data stream (e.g., data stream 302 in FIG. 8). In step 810, the results of the comparisons are analyzed to determine whether or not the hash values have a matching counterpart (i.e., the hash values associated with payload data from the data streams match). Here, it is assumed that the data streams are in synchronization; if they are not, the exemplary method 400 shown in FIG. 4 is employed. When the hash values match, the associated payload data from the main data stream (302 in FIG. 8) corresponding to the hash value being evaluated is permitted to pass to the output data stream (312 in FIG. 8) in step 812.

Alternatively, if the hash values do not match, step 814 determines whether or not the hash value being evaluated from the main data stream is missing. When it is determined that the missing hash value is not from the main data stream, the associated payload data segment from the main data stream corresponding to the hash value being evaluated is sent to the output data stream in step 816. Otherwise, when step 814 determines that that the hash value from the main data stream is missing, step 818 determines whether or not the number of consecutive missing hash values in the main data stream has exceeded a prescribed threshold. If the number of consecutive missing hash values from the main data stream has not exceeded the prescribed threshold, the missing payload data is replaced in the output data stream (312) with an identical payload data segment from the repair data stream in step 820. Alternatively, if the number of consecutive missing hash values has exceeded the prescribed threshold, rather than inserting or repairing the missing payload data using the repair data stream, a switchover from the main data stream to the repair data stream is initiated at the time of the last match between hash values.

The comparator (310) seamlessly switches data streams without interrupting the output data stream. If the threshold is set at N, the comparator will wait until N consecutive missing payload data segments are detected before switching to the repair data stream, where N is any integer greater than one; for a single missing data segment, the repair methodology described in conjunction with FIG. 7 would preferably be used.

With only two data streams available, in the event a mismatch between hash values is detected by the comparator 310, the DSRD 1001 has no way of knowing which payload data segment contains corrupt data. Consequently, the payload data from the main data stream is arbitrarily used in the output data stream, according to an embodiment of the invention. An improvement to this approach would be to use three or more data streams, so that the comparator, upon detection of a mismatch between hash values, can confirm its comparison against corresponding payload data from another data stream. For example, if the comparator detects a mismatch between hash values associated with payload data from first and second data streams, a comparison between hash values associated with payload data from the first data stream and a third data stream. If the hash values from the first and second data streams don't match, but the hash values from the first and third data stream match, it can be assumed that the payload data corresponding to the second data stream is corrupt. Likewise, if the hash values from the first and second data streams don't match, and the hash values from the first and third data stream don't match, but the hash values from the second and third data streams match, it can be assumed that the payload data corresponding to the first data stream is corrupt.

Figure 10:
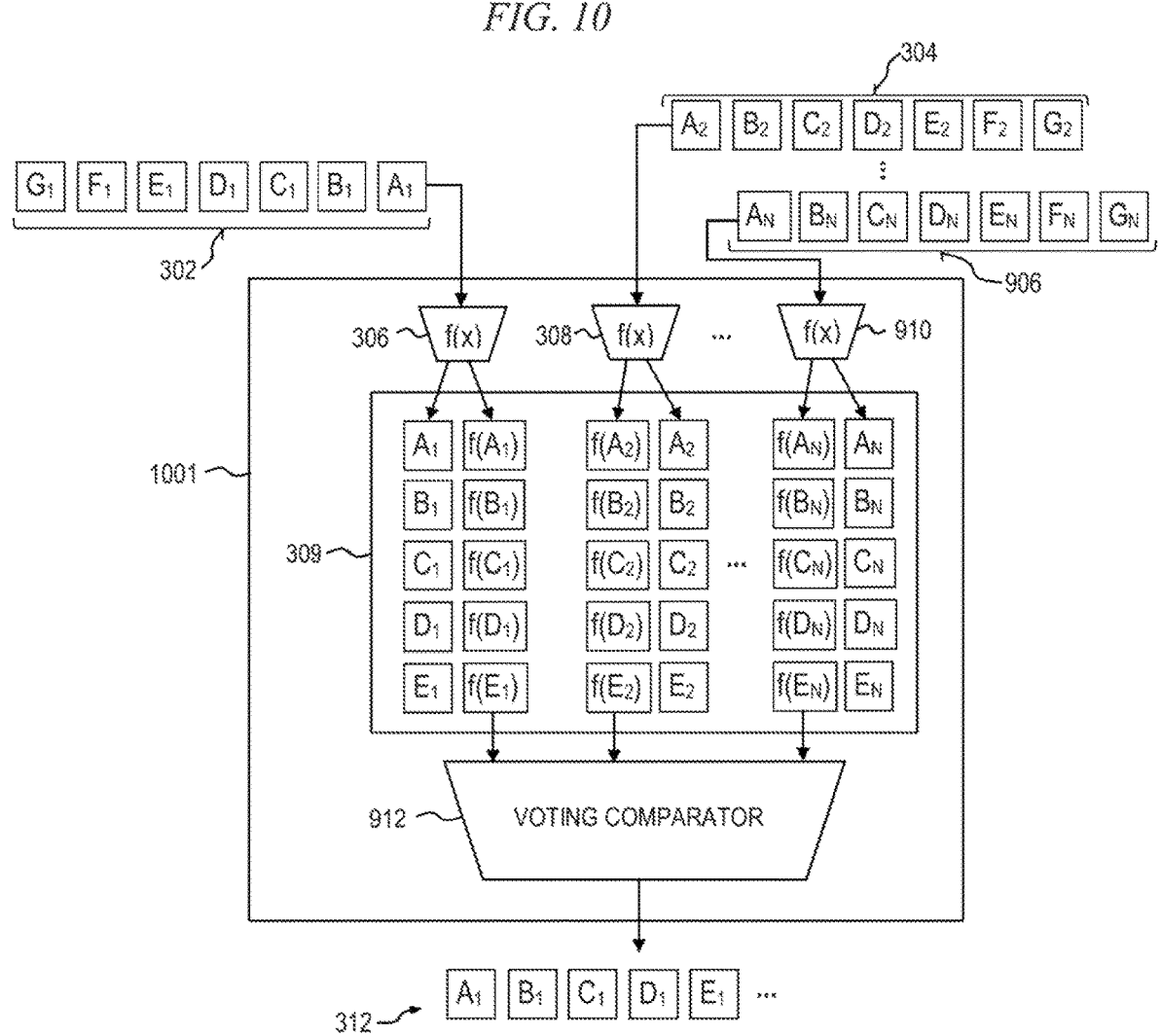
FIG. 10 is a block diagram conceptually depicting the exemplary data stream repair device shown in FIG. 4, configured to further improve an accuracy of the output stream, according to an embodiment of the invention.

FIG. 10 is a block diagram conceptually depicting the exemplary DSRD 1001 shown in FIG. 4, configured to further improve an accuracy of the output data stream, according to an embodiment of the invention. In this example, the DSRD 1001 is configured to receive three or more data streams, 302, 304 and 906, which include nominally identical payload data originating from geographically distinct locations and being conveyed over topologically distinct network paths. To accommodate the additional data stream(s), additional hashing module(s) 910 is included in the DSRD 1001. The buffer 309 is also expanded (in memory storage capability) to store payload data segments and associated hash values for the added data stream(s) 906. In place of the two-input comparator 310 shown in FIG. 4, the DSRD 1001 includes a voting comparator 912 having a number of inputs at least equal to the number of received data streams.

The voting comparator 912 is operative to select optimal payload data for building the output data stream 312 among a plurality of payload data candidates from the various data streams 302, 304, 906. Similar to comparator 310 previously described, voting comparator 912 includes functionality (e.g., a controller) to determine which of the received data streams 302, 304, 906 is to be designated as the main data stream (with the remaining data streams designated as repair data streams), and to determine synchronization and delay between arrival of the data streams at the DSRD 1001. In this example, the main data stream is data stream 302 and data streams 304 and 906 are repair data streams. It should be understood that there is theoretically no limit to the number of repair data streams. A depth of the buffer 309 may also be expanded to provide added computation time for the comparator 912, since the time required for performing the additional hash value comparisons and other processing will likely increase.

The data streams 302, 304 and 906 send payload data to the hashing modules 306, 308 and 910, respectively, while the comparator 310 performs multiple comparisons of the associated hash values to determine what payload data should be repaired, in the case of missing and/or corrupt payload data (see FIG. 9), or whether a switchover to a secondary data stream should be made, in the case of a detected failure of the primary data stream. As shown in FIG. 10, data stream 302 includes payload data $A_1$ through $G_1$, and data stream 304 includes payload data $A_2$ through $G_2$, and data stream 906 includes payload data $A_N$ through $D_N$, where N is an integer representing the number of data streams received at the DSRD 1001. In this example, data stream 302 originates from a first location (e.g., North Carolina), data steam 304 originates from a second location (e.g., Colorado), and data stream 906 originates from a third location (e.g., Texas). It should be noted that, although only data segments A through G are depicted, each of the data streams 302, 304, 906 includes, generally, payload data $A_1$ through $N_1$, $A_2$ through $N_2$ and $A_N$ through $M_N$, respectively, where M is any integer representative of the number of payload data segments transmitted from its corresponding source.

Payload data $A_1$ through $E_1$ from data stream 302, payload data $A_2$ through $E_2$ from data stream 304, and payload data $A_N$ through $E_N$ from data stream 906, are presented to corresponding hashing modules 306, 308 and 910, respectively, which compute hash values for each payload data segment. The payload data from the data streams 302, 304 and 906 are temporarily stored in the buffer 309, along with associated hash values $f(A_1)$ through $f(E_1)$, $f(A_2)$ through $f(E_2)$, and $f(A_N)$ through $f(E_N)$, respectively, computed by hashing modules 306, 308, 910. These payload data segments and associated hash values are shown, by way of illustration only, for a given moment in time.

Once payload data from one or more data streams arrives and the process of determining hash values is underway, the comparator 912 begins determining if there are any hash values with matching counterparts in buffer 309. Using methods previously described for determining a synchronization starting point, the comparator 912 starts by matching hash values from two data streams, such as $f(B_1)$ and $f(B_2)$, to determine a delay or lead/lag time between the arrival of the two payload data segments from data streams 302 and 304. The comparator 912 then attempts to match hash values from two other data streams, for example, $f(B_1)$ and $f(B_N)$, to determine the delay or lead/lag time between the arrival of the two payload data segments from data streams 302 and 906. This process is repeated until the respective delays between the main data stream 302 and the remaining repair data streams 304, 906 are determined.

The hash values stored in the buffer 309 are inputted to comparator 912. The comparator 912, knowing and compensating for delay or lead/lag time, if any, between the arrival of the data streams 302, 304 (e.g., by using one or more of the exemplary methods previously described for determining a synchronization starting point), attempts to match hash values $f(A_1)$ through $f(E_1)$ associated with payload data segments $A_1$ through $E_1$, respectively, from the main data stream 302 with the hash values $f(A_2)$ through $f(E_2)$ associated with payload data segments $A_2$ through $E_2$, respectively, from data stream 304. If a mismatch is detected between a given pair of hash values from the main and repair data streams, such as $f(A_1)$ and $f(A_2)$, which would indicate that one of the associated payload data segments is corrupt, the comparator 912 matches the hash value from the main data stream 302 with the corresponding hash value from the third data stream 906, namely, $f(A_N)$, as a confirmation. A match in this case will confirm that the payload data from data stream 304 is corrupt. As more data streams are available for comparison, a higher confidence in the payload data is obtained for use in the output data stream. However, this accuracy comes at the expense of increased complexity and processing overhead.

Figure 11:
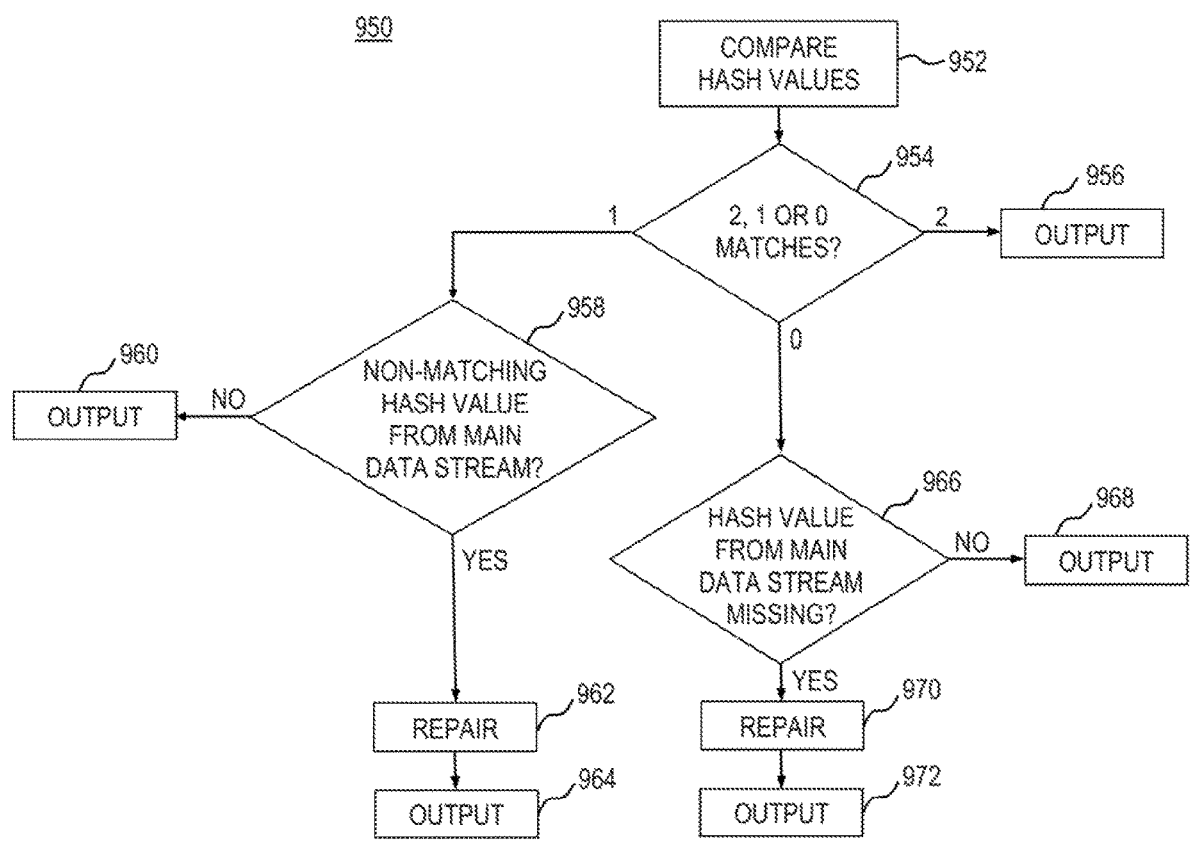
FIG. 11 is a data flow diagram depicting at least a portion of an exemplary method for repairing a data stream experiencing intermittent data loss, according to another embodiment of the invention.

FIG. 11 is a data flow diagram depicting at least a portion of an exemplary method 950 for repairing a data stream experiencing intermittent data loss, according to another embodiment of the invention. Method 950 may be employed in the illustrative DSRD 1001 shown in FIG. 10 to repair missing or corrupt payload data in a manner which utilizes a main data stream and two or more repair data streams. As in the illustrative methods (e.g., method 400 shown in FIG. 5) described above, the first data stream to arrive at the DSRD (e.g., data stream 302 in FIG. 10) is designated as the main data stream, with the remaining data streams (e.g., data streams 304 and 906 in FIG. 10) serving as repair data streams.

Prior to the start of method 950, it is assumed that payload data is received by the DSRD 1001. The payload data originates from at least three data streams (e.g., 302, 304 and 906 in FIG. 10) comprising nominally identical payload data originating from geographically distinct locations and being conveyed over topologically distinct network paths. Hash values corresponding to each of the received payload data segments are determined (e.g., by hashing modules 306, 308 and 910 in FIG. 10). After hash values for the payload data segments being processed are determined (e.g., by hashing modules 306, 308 and 910 in FIG. 10), the hash values and associated payload data segments are stored, such as in a buffer (e.g., buffer 309 in FIG. 10) or alternative memory.

With reference to FIG. 11, knowing and compensating for delay or lead/lag time, if any, between the arrival of the data streams (e.g., by using one or more of the exemplary methods previously described for determining a synchronization starting point), hash values of payload data from the received data streams are compared in step 952 (e.g., by comparator 912 in FIG. 10) to determine if there are any corrupt or missing payload data in the main data stream 302. In step 954, the results of the comparisons are analyzed to determine whether or not the hash values match, as well as how many matches there are. Here, it is assumed that the data streams are in synchronization; if they are not, the exemplary method 400 depicted in FIG. 4 and described above can be employed.

In this example, a voting comparator (e.g., comparator 912 in FIG. 10) is used, which is operative to determine if a hash value from the main data stream has two other matching hash values, one other matching hash value, or no other matching hash value. If the hash value has two other matching hash values, which is indicative of the hash value from the main data stream matching all hash values from the remaining repair data stream (e.g., all three hashes values $f(A_1)$, $f(A_2)$ and $f(A_N)$ match), then the comparator 912 determines that the data segment $(A_1)$ from the main data stream 302 is present and accurate. The comparator 912 then passes the payload data (e.g., payload data segment $A_1$) associated with the hash value from the main data stream (e.g., $f(A_1)$) to the output data stream in step 956.

In step 954, if the comparator determines that the hash value from the main data stream has one other matching hash value (e.g., $f(A_1)$ matches $f(A_2)$, or $f(A_1)$ matches $f(A_N)$), this indicates that one of the three expected hash values is missing or corrupt. Thus, at step 958, knowing that one hash value is missing or corrupt, the comparator 912 determines if the corrupt or missing hash value is from the main data stream 302. This can be achieved by analyzing the results of the comparisons. If the hash value of the main data stream matches one of the repair data streams, it is assumed that the corrupt or missing payload data resides in the other repair data stream, and that the associated payload data segment in the main data stream is present and correct. In this case, the payload data (e.g., $A_1$) associated with the hash value from the main data stream is passed to the output stream in step 960. Alternatively, if the hash value corresponding to the main data stream does not match either of the repair data streams, it assumed that the payload data in the main data stream is missing or corrupt. If the corrupt or missing hash value is from the main data stream, it does not matter whether it is missing or corrupt, it is simply replaced (i.e., repaired) in step 962 with one of the two payload data segments (e.g., $A_2$ or $A_N$) associated with the two matching hash values. This payload data segment is then passed to the output data stream in step 964 so that there is no loss of data, and thus no glitch, in the output stream.

Referring again to step 954, if the comparator determines that there are no matching hash values (e.g., no matches among $f(A_1)$, $f(A_2)$, $f(A_N)$), then at step 966, the comparator determines whether the hash value associated with the payload data from the main data stream is missing. If the hash value, and hence the payload data, from the main data stream is not missing, then the payload data segment from the main data stream is passed to the output data stream in step 968, knowing that it may be corrupt because no matches found among the three expected hash values. If at step 966, the comparator determines that the hash value corresponding to the main data stream is missing, then the comparator, in step 970, selects corresponding payload data from either of the repair data streams (e.g., 304 and 906 in FIG. 10) to replace the missing payload data, knowing that corruption in one or both payload data segments is cryptographically certain. The comparator then passes the payload data segment to the output stream in step 972.

Figure 12:
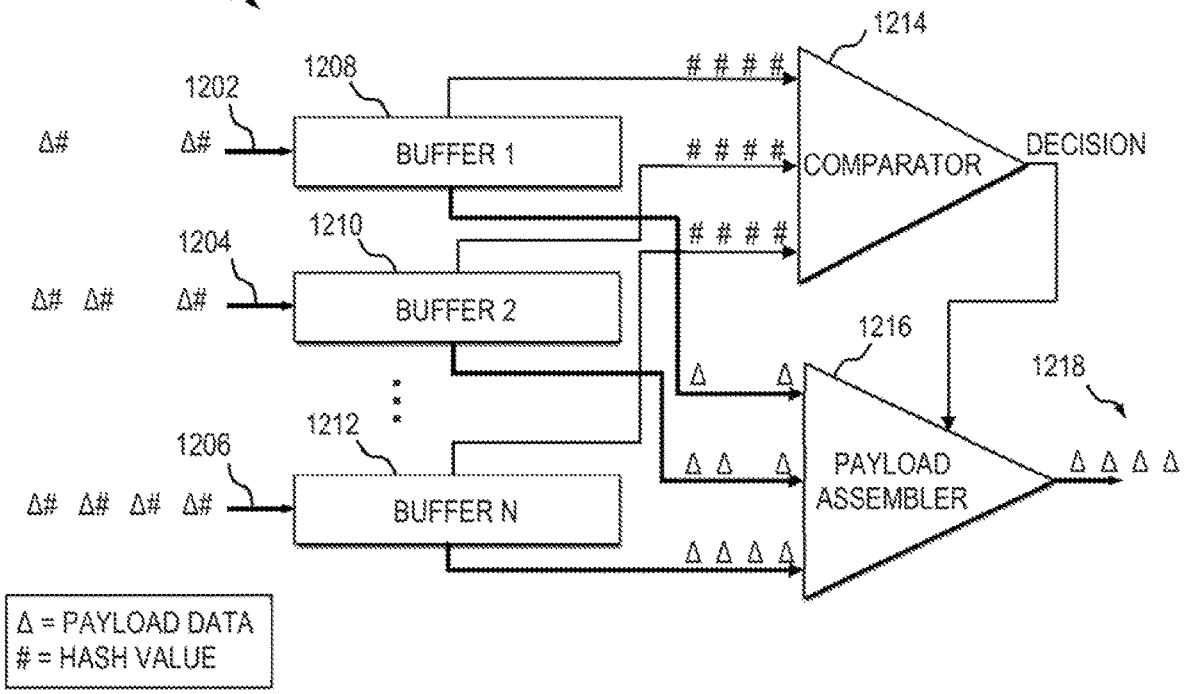
FIGS. 12 and 13 are block diagrams conceptually depicting at least a portion of an exemplary time-based buffering system suitable for use in the exemplary data stream repair device shown in FIG. 10 at a discrete moment in time, according to an embodiment of the invention.
Figure 13:
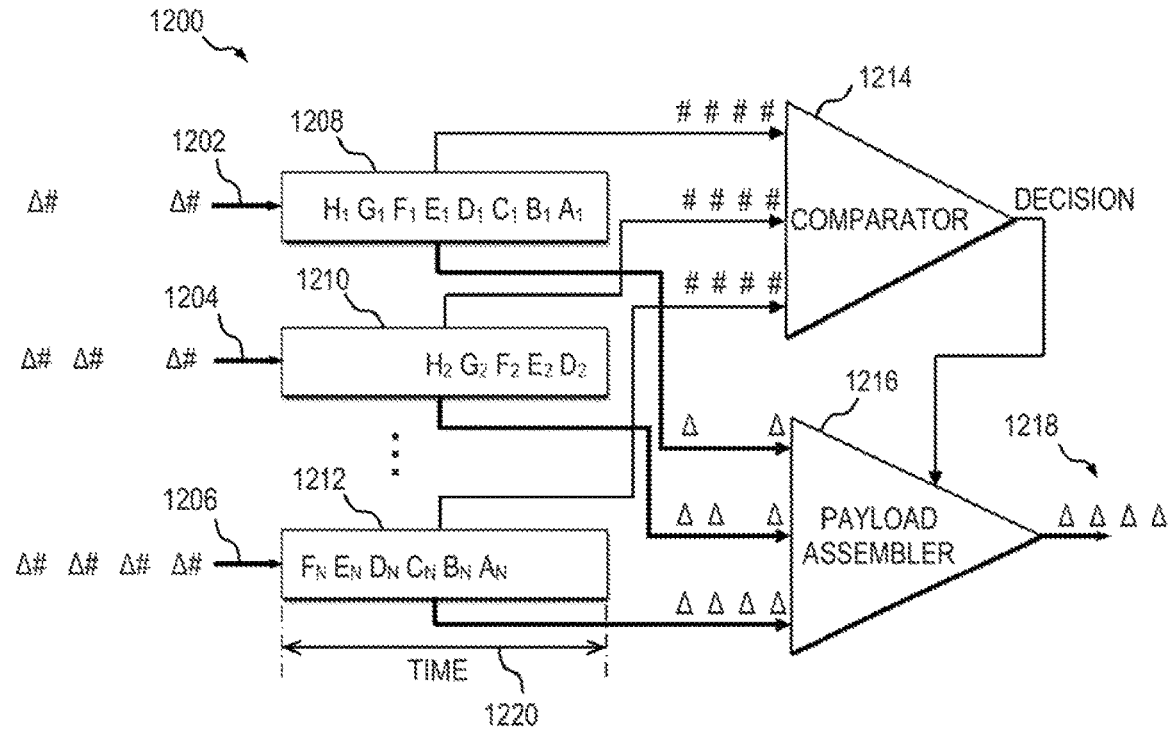

FIGS. 12 and 13 are block diagrams conceptually depicting at least a portion of an exemplary time-based buffering system 1200, suitable for use in the exemplary DSRD 1001 shown in FIG. 10, at a discrete moment in time, according to an embodiment of the invention. The time-based buffering system 1200 incorporates at least portions of the exemplary buffer 309 and comparator 912 in the DSRD 1001 of FIG. 10. Specifically, with reference to FIG. 12, the time-based buffering system 1200 includes buffers 1208, 1210 and 1212, each buffer being adapted to receive a corresponding input stream 1202, 1204 and 1206, respectively. Although depicted as separate buffers corresponding to each input stream, a single memory space may be employed, with the data from each input stream being stored in a corresponding partition of the memory space, according to embodiments of the invention. The buffers 1208, 1210 and 1212 represent an embodiment of the buffer 309 shown in FIG. 10. The input streams 1202, 1204, 1206 convey payload data and associated hash values for storage in corresponding buffers 1208, 1210, 1212; these input streams, in one embodiment, represent the outputs from the hashing modules 306, 308 910 to the buffer 309 in FIG. 10.

The time-based buffering system 1200 further includes a comparator 1214 and a payload assembler 1216. The comparator 1214 is configured to receive hash values stored in the buffers 1208, 1210, 1212 and is operative to compare the hash values to determine which of the data streams to use for an output data stream 1218 at any given time. The payload assembler 1216 is configured to receive hash data (i.e., hash values) from the buffers 1208, 1210, 1212 and is operative to de-queue the payload data from the correct buffer(s) to generate the output data stream 1218.

Generally, comparing payload data from multiple data streams that are not in synchronization at the time of arrival at the hashing modules (e.g., 306, 308, 910 in FIG. 10) requires a certain amount of memory to store both the payload data and their corresponding hash values as the payload data segments arrive and the hash values are generated. The payload data segments (i.e., datums) from the respective input streams 1202, 1204, 1206 are stored in the buffer memory 1208, 1210, 1212 along with their associated hash values, in accordance with one embodiment. In alternative embodiments, the hash values and payload data are stored in separate memory; or, the payload data can be buffered while the hash data is stored in a more traditional memory lookup table with pointers to the associated payload data stored in the buffer. It is to be understood, however, that embodiments of the invention are not limited to any specific organization of the buffer memory, nor are they limited to the particular manner in which the payload data and associated hash values are stored and accessed. The memory storage capacity should be large enough to at least temporarily hold a range of sequential payload data and related hash values from each of the received data streams. A depth of the buffer(s) will be determined as a function of how much time skew and/or how much data loss the system designer wishes to be able to correct and/or repair without glitches and data loss in the output data stream 1218.

With reference to FIGS. 12 and 13, each buffer memory 1208, 1210 and 1212 is allocated to a specific input stream 1202, 1204 and 1206, respectively, and receives payload data and corresponding hash values for storage therein. For instance, buffer memory 1208 receives payload data (denoted as "Δ") and corresponding hash values (denoted as "#") from input stream 1202, buffer memory 1210 receives payload data and corresponding hash values from input stream 1204, and buffer memory 1212 receives payload data and corresponding hash values from input stream 1206. FIG. 13 illustrates specific hash values and payload data stored in buffer memory 1208, 1210 and 1212, where the specific position of the hash value and payload data represents the time in which they were received. Stored in buffer memory 1208 are hash values and associated payload data $A_1$, $B_1$, $C_1$, $D_1$, $E_1$, $F_1$, $G_1$ and $H_1$. Stored in buffer memory 1210 are hash values and associated payload data $D_2$, $E_2$, $F_2$, $G_2$ and $H_2$. Stored in buffer memory 1212 are hash values and associated payload data $A_N$, $B_N$, $C_N$, $D_N$, $E_N$, and $F_N$, where N represents the total number of data streams, which in this example is three.

As shown in FIG. 13, hash values and associated payload data $D_1$, $D_2$ and $D_N$ are illustrated as being in different locations in each buffer memory, representing an arrival at the respective hashing modules at different times. In this example, referring to time line 1220, hash value and associated payload data $D_2$ arrive in buffer memory 1210 ahead of hash value and associated payload data $D_1$ in buffer memory 1208, and ahead of hash value and associated payload data $D_N$ in buffer memory 1212. While buffers 1208, 1210, 1212 are continuously receiving payload data and corresponding hash values, comparator 1214 continuously determines which payload data to use and instructs payload assembler 1216 to retrieve the appropriate payload data from either buffer memory 1208, 1210 or 1212.

Additional optimizations to and arrangements of the above illustrative embodiments are contemplated by those skilled in the art given the teachings herein. For example, according to one or more embodiments of the invention, an existing data flag can be employed in a content stream (e.g., data stream) to identify a set of payload data in the stream that is not expected to be identical, such as when two streams of a given channel whose content is the same but have different commercials inserted during advertising breaks. It may be desirable to have the DSRD 1001 override this temporary lack of synchronization as a function of the data flag, or other identifier. For example, DSRD 1001 may perform comparisons on the main content and at the advertisement insertion point, the DSRD 1001 may instruct the comparator to ignore or turn on/off the comparison process until the payload data from the advertisement passes, and then return to the synchronization, comparison and repair processes previously described. One example of a suitable flag is the Society of Cable Telecommunications Engineers American national Standard ANSI/SCTE 35 2007, Digital Program Insertion Cueing Message for Cable, expressly incorporated herein by reference in its entirety for all purposes. Other optimizations according to one or more embodiments include, for example, looking into the payload data to find and use existing sequence/frame numbers in the data/header. These sequence/frame numbers can be used to determine synchronization and perform comparisons by noting subsequent numbering, rather than by hashing.

At least a portion of the data stream repair device according to aspects of the invention can be implemented in software and/or hardware, for example, in one or more field-programmable gate arrays (FPGA), one or more application-specific integrated circuits (ASIC), custom fabricated chips, video processing cards, graphics processing unit (GPU), etc.; for example, GPUs designed to hardware accelerate encoding and decoding of MPEG-2 and MPEG-4 streams. Generally, computer hardware capable of encoding, decoding and/or comparing of data can be configured to perform one or more of the methods according to embodiments of the invention described herein.

System and Article of Manufacture Details

Embodiments of the invention can employ hardware aspects or a combination of hardware and software aspects, as previously stated. Software includes but is not limited to firmware, resident software, microcode, etc. One or more embodiments of the invention or elements thereof can be implemented in the form of an article of manufacture including a machine readable medium that contains one or more programs which when executed implement such step(s); that is, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included. The means are defined to exclude transmission media per se or disembodied signals per se.

Figure 14:
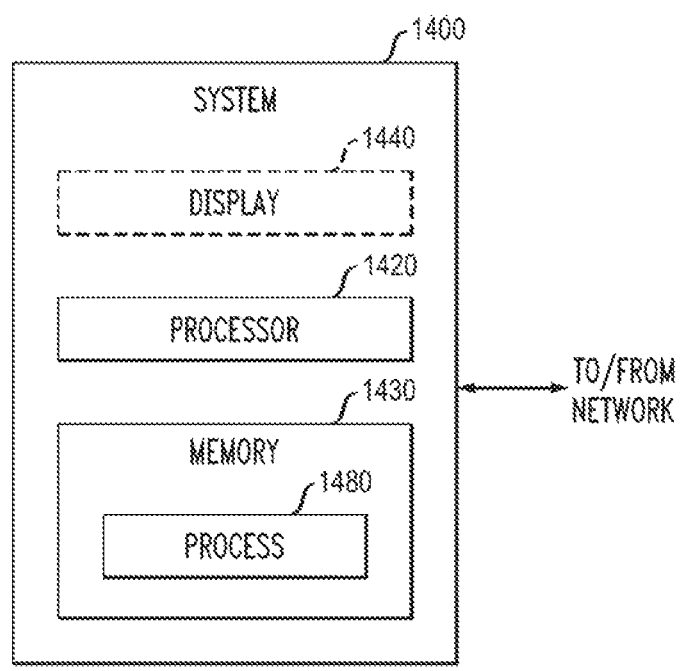
FIG. 14 is a block diagram depicting an exemplary system configurable for implementing at least some aspects of the invention, according to an embodiment of the invention.

FIG. 14 is a block diagram of a system 1400 that can implement at least some aspects of the invention, and is representative, for example, of one or more of the servers shown in the figures. The processor, memory, and process are also representative of aspects of the functionality of the exemplary controller 311 shown in FIG. 4, the comparator 310 shown in FIGS. 4, 6 and 8, or the voting comparator 912 shown in FIG. 10. As shown in FIG. 14, memory 1430 configures the processor 1420 to implement one or more methods, steps, and functions (collectively, shown as process 1480 in FIG. 14). The memory 1430 could be distributed or local and the processor 1420 could be distributed or singular. Different steps could be carried out by different processors (e.g., concurrently, when applicable).

The memory 1430 could be implemented as an electrical, magnetic or optical memory, or any combination of these or other types of storage devices. It should be noted that if distributed processors are employed, each distributed processor that makes up processor 1420 generally contains its own addressable memory space. It should also be noted that some or all of computer system 1400 can be incorporated into an application-specific or general-use integrated circuit. For example, one or more method steps could be implemented in hardware in an ASIC rather than using firmware. Display 1440 is representative of a variety of possible input/output devices (e.g., keyboards, monitor, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 1400 or processing capability on another component having a suitable processor), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods (e.g., methods 400, 600, 800, or 950 shown in FIG. 5, 7, 9, or 11, respectively) or claims set forth herein when such program is run, for example, on controller 311 (FIG. 4), and the like, and that such program may be embodied on a tangible computer readable recordable storage medium.

As used herein, including the claims, a "server" includes a physical data processing system (for example, system 1400 as shown in FIG. 14) running a server program. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g., controller 311 shown in FIG. 4). The method steps can then be carried out using the distinct software modules of the system, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for providing seamless redundancy in an output data stream, the method comprising the steps of:

receiving, in a headend of a content network, a first unencrypted data stream originating from a first content source residing in a first location, the first data stream being conveyed over a first network path;

receiving and decrypting, in the headend, at least an encrypted second data stream originating from a second content source residing in a second location that is geographically distinct from the first location, the second data stream comprising nominally identical content relative to the first data stream, the second data stream being conveyed over a second network path that is topologically distinct from the first network path, wherein the second data stream is encrypted between the second content source and the headend throughout the second network path; and computing first hash values in the headend as a function of first data segments from the first data stream;

computing second hash values in the headend as a function of second data segments from the second data stream, wherein the second hash values are calculated based on the decrypted second data stream;

combining the first data segments and the second data segments based at least in part on the first hash values and the second hash values to generate a single, uninterrupted output data stream having a reduced likelihood of at least one of overlapping, missing and corrupt data segments;

wherein at least a portion of the first data stream and at least a portion of the second data stream are received simultaneously.

2. The method of claim 1, wherein the step of combining the first and second data segments from the first and second data streams, respectively, comprises:

comparing the first data segments from the first data stream with corresponding second data segments from the second data stream to determine whether any of the first data segments includes missing or corrupt data;

when it is determined that the first and second data segments match, generating the output data stream from the first data segments; and when it is determined that at least a given one of the first data segments includes missing or corrupt data, replacing the given one of the first data segments with a corresponding one of the second data segments in the output data stream.

3. The method of claim 1, wherein each of the first and second data streams comprises a plurality of data packets, the method further comprising stripping an encapsulation from data packets in the first data stream to obtain the first data segments, and stripping an encapsulation from data packets in the second data stream to obtain the second data segments.

4. The method of claim 3, wherein the data packets in each of the first and second data streams are one of Internet Protocol packets and voice data packets, and each of the first and second data segments comprises payload data from a corresponding one of the data packets.

5. The method of claim 1, further comprising synchronizing an arrival of the first and second data streams.

6. The method of claim 5, wherein the step of synchronizing the arrival of the first and second data streams comprises:

comparing the first data segments from the first data stream and the second data segments from the second data stream;

when a match is detected between a given one of the first data segments and a corresponding one of the second data segments, determining that the first and second data streams are synchronized; and when no match is detected between a given one of the first data segments and a corresponding one of the second data segments, determining a delay between the first and second data streams.

7. The method of claim 6, wherein comparing the first data segments from the first data stream and the second data segments from the second data stream is based at least on all payload data within a given one of the first data segments and all payload data within a given one of the second data segments.

8. The method of claim 6, wherein the step of determining a delay between the first and second data streams comprises determining where, in a stored sequence of data segments, a data segment from the first data stream matches a data segment from the second data stream.

9. The method of claim 6, wherein the step of determining a delay between the first and second data streams comprises examining respective buffered sequences of at least one of hash values and payload data corresponding to the first and second data streams.

10. The method of claim 6, further comprising adjusting an alignment between first and second data segments in a stored sequence of data segments as a function of the delay between the first and second data streams.

11. The method of claim 1, further comprising:

storing at least a subset of the first and second hash values with associated first and second data segments, respectively;

determining whether there is a match between a given one of the first data segments and a corresponding one of the second data segments as a function of a comparison of hash values associated with the given one of the first data segments and the corresponding one of the second data segments.

12. The method of claim 1, further comprising:

comparing the first data segments from the first data stream with corresponding second data segments from the second data stream to determine whether any of the first data segments is missing;

when a number of missing sequential first data segments exceeds a prescribed threshold, generating the output data stream from the second data segments.

13. The method of claim 1, further comprising:

receiving a third data stream originating from a third content source residing in a third location that is geographically distinct from the first and second locations, the third data stream comprising nominally identical content relative to the first and second data streams, the third data stream being conveyed over a third network path that is topologically distinct from the first and second network paths;

computing third hash values as a function of the third data segments; and combining the first and second data segments from the first and second data streams, respectively, and third data segments from the third data stream based at least in part on the first hash values, the second hash values and the third hash values to generate a single, uninterrupted output data stream having a reduced likelihood of at least one of overlapping, missing and corrupt data segments;

wherein at least the portion of the first data stream, at least the portion of the second data stream, and at least a portion of third data stream are received simultaneously.

14. The method of claim 13, wherein the step of combining the first, second and third data segments comprises:

comparing the first, second and third hash values associated with the first, second and third data segments, respectively, to determine whether there is a match between a given one of the first data segments and a corresponding one of the second and third data segments;

when the first hash value associated with the given one of the first data segments matches the second hash value associated with the corresponding one of the second data segments and the third hash value associated with the corresponding one of the third data segments, generating the output data stream from the given one of the first data segments;

when the first hash value associated with the given one of the first data segments matches either the second hash value associated with the corresponding one of the second data segments or the third hash value associated with the corresponding one of the third data segments but not both, generating the output data stream from the given one of the first data segments; and when the first hash value associated with the given one of the first data segments matches neither the second hash value associated with the corresponding one of the second data segments nor the third hash value associated with the corresponding one of the third data segments, generating the output data stream from either the corresponding one of the second data segments or the corresponding one of the third data segments.

15. The method of claim 13, wherein the step of combining the first, second and third data segments comprises:
storing at least a subset of the first, second and third hash values with associated first, second and third data segments, respectively.

16. The method of claim 15, wherein the step of combining the first, second and third data segments comprises:
comparing the first, second and third hash values corresponding to the first, second and third data segments, respectively, to determine whether there are any missing or corrupt first data segments;
determining whether there is a match between a given one of the first data segments and a corresponding one of the second and third data segments as a function of a comparison of hash values corresponding to the first, second and third data segments;
when the given one of the first data segments matches the corresponding one of the second data segments and the corresponding one of the third data segments, generating the output data stream from the given one of the first data segments;
when the given one of the first data segments matches either the corresponding one of the second data segments or the corresponding one of the third data segments but not both, generating the output data stream from the given one of the first data segments; and
when the given one of the first data segments matches neither the corresponding one of the second data segments nor the corresponding one of the third data segments, generating the output data stream from either the corresponding one of the second data segments or the corresponding one of the third data segments.

17. The method of claim 1, further comprising performing additional processing in the second network path relative to the first network path thereby delaying the received second data stream relative to the received first data stream.

18. The method of claim 1, wherein at least one of the first content source and the second content source comprises at least one of a broadcast feed and a satellite feed.

19. The method of claim 1, wherein at least one of the first content source and the second content source comprises at least one of a national feed and a local feed.

20. The method of claim 1, further comprising:
computing respective first hash values corresponding to each of the first data segments from the first data stream; and
computing respective second hash values corresponding to each of the second data segments from the second data stream.

21. The method of claim 20, wherein a given one of the first hash values is computed as a function at least of all payload data within the corresponding one of the first data segments, and wherein a given one of the second hash values is computed as a function at least of all payload data within the corresponding one of the second data segments.

22. An apparatus for use in a content-based network for providing seamless redundancy in an output data stream, the apparatus being located in a headend of said content-based network, the apparatus comprising:
a first hashing module configured to receive a first unencrypted data stream originating from a first content source residing in a first location, the first data stream being conveyed over a first network path, the first hashing module computing first hash values as a function of first data segments from the first data stream;
a demodulation and decryption module configured to receive and decrypt an encrypted second data stream originating from a second content source residing in a second location that is geographically distinct from the first location, the second data stream comprising nominally identical content relative to the first data stream, the second data stream being conveyed over a second network path that is topologically distinct from the first network path, the second data stream being encrypted between the second content source and the headend;
a second hashing module configured to receive the decrypted second data stream, the second hashing module computing second hash values as a function of second data segments from the second data stream following decryption of the second data stream; and
a controller coupled with the first and second hashing modules, the controller being operative to combine first data segments from the first data stream and second data segments from the second data stream based at least in part on the first hash values and the second hash values in a manner which generates a single, uninterrupted output data stream having a reduced likelihood of at least one of overlapping, missing and corrupt data segments;
wherein the apparatus is configured to simultaneously receive at least a portion of the first data stream and at least a portion of the second data stream.

23. The apparatus of claim 22, wherein the controller is operative: to compare the first data segments from the first data stream and the second data segments from the second data stream; to determine that the first and second data streams are synchronized when a match is found between a given one of the first data segments and a corresponding one of the second data segments; and to determine a delay between the first and second data streams when no match is detected between the given one of the first data segments and the corresponding one of the second data segments.

24. The apparatus of claim 22, further comprising:
a third hashing module, the third hashing module being operative to receive a third data stream originating from a third content source residing in a third location that is geographically distinct from the first and second locations, the third data stream comprising nominally identical content relative to the first and second data streams, the third data stream being conveyed over a third network path that is topologically distinct from the first and second network paths, the third hashing module computing third hash values as a function of the third data segments; and
memory coupled with the first, second and third hashing modules, the memory being operative to store at least a subset of the first, second and third hash values with associated first, second and third data segments, respectively;
wherein the controller is operative to combine the first and second data segments from the first and second data streams, respectively, and third data segments from the third data stream based at least in part on the first hash values, the second hash values, and the third hash values to generate a single, uninterrupted output data stream having a reduced likelihood of at least one of overlapping, missing and corrupt data segments;
wherein the apparatus is configured to simultaneously receive at least the portion of the first data stream, at least the portion of the second data stream, and at least a portion of the third data stream.

25. The apparatus of claim 24, wherein the controller is operative: to compare the first, second and third hash values corresponding to the first, second and third data segments, respectively, to determine whether there are any missing or corrupt first data segments; to determine whether there is a match between a given one of the first data segments and a corresponding one of the second and third data segments as a function of a comparison of hash values corresponding to the first, second and third data segments; to generate the output data stream from the given one of the first data segments when the given one of the first data segments matches the corresponding one of the second data segments and the corresponding one of the third data segments; to replace the given one of the first data segments with the matching corresponding one of the second or the third data segments in the output data stream when the given one of the first data segments does not match the corresponding one of the second data segments or the corresponding one of the third data segments, and the corresponding one of the second and third data segments match each other.

26. A data stream repair device for providing seamless switching between data streams in a content-based network, the data stream repair device being located in a headend of the content-based network, the data stream repair device comprising:
a first hashing module configured to receive a first unencrypted data stream originating from a first content source residing in a first location, the first data stream being conveyed over a first network path, the first hashing module computing first hash values as a function of first data segments from the first data stream;
a demodulation and decryption module configured to receive and decrypt an encrypted second data stream originating from a second content source residing in a second location that is geographically distinct from the first location, the second data stream comprising nominally identical content relative to the first data stream, the second data stream being conveyed over a second network path that is topologically distinct from the first network path, the second data stream being encrypted between the second content source and the headend;
a second hashing module configured to receive the decrypted second data stream, the second hashing module computing second hash values as a function of second data segments from the second data stream following decryption of the second data stream; and
a controller coupled with the first and second hashing modules, the controller being operative to combine the first data segments and the second data segments based at least in part on the first hash values and the second hash values in a manner which generates a single, uninterrupted output data stream having a reduced likelihood of at least one of overlapping, missing and corrupt data segments;
wherein the device is configured to simultaneously receive at least a portion of the first data stream and at least a portion of the second data stream.

27. An article of manufacture comprising a computer program product for providing seamless redundancy in an output data stream distributed in a content-based network, said computer program product comprising:
a tangible computer-readable recordable storage medium, which stores in a non-transitory manner computer readable program code that when loaded in a processor of a content-based network headend causes the processor to facilitate a method comprising:
receiving a first unencrypted data stream originating from a first content source residing in a first location, the first data stream being conveyed over a first network path;
receiving and decrypting at least a portion of an encrypted second data stream simultaneously with at least a portion of the first data stream, the encrypted second data stream originating from a second content source residing in a second location that is geographically distinct from the first location, the second data stream comprising nominally identical content relative to the first data stream, the second data stream being conveyed over a second network path that is topologically distinct from the first network path, the second data stream being encrypted between the second content source and the headend;
computing first hash values as a function of first data segments from the first data stream;
computing second hash values as a function of second data segments from the second data stream following decryption of the second data stream; and
combining the first data segments and the second data segments based at least in part on the first hash values and the second hash values to generate a single, uninterrupted output data stream having a reduced likelihood of at least one of overlapping, missing and corrupt data segments.

28. An apparatus, located in a headend of a content-based network, for providing seamless redundancy in an output data stream, the apparatus comprising:
means for receiving a first unencrypted data stream originating from a first content source residing in a first location, the first data stream being conveyed over a first network path;
means for receiving and decrypting at least an encrypted second data stream originating from a second content source residing in a second location that is geographically distinct from the first location, the second data stream comprising nominally identical content relative to the first data stream, the second data stream being conveyed over a second network path that is topologically distinct from the first network path, the second data stream being encrypted between the second content source and the headend;

means for computing first hash values as a function of first data segments from the first data stream;

means for computing second hash values as a function of second data segments from the second data stream following decryption of the second data stream; and means for combining first data segments from the first data segments and the second data segments based at least in part on the first hash values and the second hash values to generate a single, uninterrupted output data stream having a reduced likelihood of at least one of overlapping, missing and corrupt data segments;

wherein the apparatus is configured to simultaneously receive at least a portion of the first data stream and at least a portion of the second data stream.

* * * * *